MULTIPLE TRACK MAGNETIC TAPE RECORDING APPARATUS

Original Filed Sept. 3, 1964 8 Sheets-Sheet 1

Arthur A. Cavelos
John S. Smith
Bernard Viguerie-Noel
INVENTORS

BY Richard E. Bee
ATTORNEY

MULTIPLE TRACK MAGNETIC TAPE RECORDING APPARATUS

Original Filed Sept. 3, 1964 8 Sheets-Sheet 2

Arthur A. Cavelos
John S. Smith
Bernard Viguerie-Noel
INVENTORS

BY Richard E. Bee
ATTORNEY

MULTIPLE TRACK MAGNETIC TAPE RECORDING APPARATUS

Original Filed Sept. 3, 1964 8 Sheets-Sheet 3

Arthur A. Cavelos
John S. Smith
Bernard Viguerie-Noel
INVENTORS

BY Richard E. Bee
ATTORNEY

MULTIPLE TRACK MAGNETIC TAPE RECORDING APPARATUS

Original Filed Sept. 3, 1964 8 Sheets-Sheet 4

| DATA | RUN | SWITCH | WORD |
|---|---|---|---|
| DEPTH | 1 | — | 1 |
| IL-D | 1 | 1 | 3 |
| IL-M | 1 | 2 | 5 |
| EL-S | 1 | 3 | 7 |
| SP | 1 | 4 | 9 |
| PL | 2 | 1 | 2 |
| ML-N | 2 | 2 | 4 + 10 |
| ML-I | 2 | 3 | 6 + 12 |
| CAL. | 2 | 4 | 8 |
| SONIC | 3 | 1 | 11 |

Arthur A. Cavelos
John S. Smith
Bernard Viguerie-Noel
INVENTORS

BY Richard E. Bee
ATTORNEY

MULTIPLE TRACK MAGNETIC TAPE RECORDING APPARATUS

Original Filed Sept. 3, 1964 8 Sheets-Sheet 5

Arthur A. Cavelos
John S. Smith
Bernard Viguerie-Noel
INVENTORS

BY Richard E. Bee

ATTORNEY

MULTIPLE TRACK MAGNETIC TAPE RECORDING APPARATUS

Original Filed Sept. 3, 1964 8 Sheets-Sheet 6

Arthur A. Cavelos
John S. Smith
Bernard Viguerie-Noel
INVENTORS

BY Richard E. Bee
ATTORNEY

MULTIPLE TRACK MAGNETIC TAPE RECORDING APPARATUS

Original Filed Sept. 3, 1964 8 Sheets-Sheet 7

Arthur A. Cavelos
John S. Smith
Bernard Viguerie-Noel
INVENTORS

BY Richard E. Bee
ATTORNEY

INVENTORS
Arthur A. Cavelos
John S. Smith
Bernard Viguerie-Noel
BY Richard E. Bee
ATTORNEY 3,564,523

MULTIPLE TRACK MAGNETIC TAPE RECORDING APPARATUS

Arthur A. Cavelos, North Syracuse, N.Y., John S. Smith, London, England, and Bernard Viguerie-Noël, Westport, Conn., assignors to Schlumberger Technology Corporation, New York, N.Y., a corporation of Texas Original application Sept. 3, 1964, Ser. No. 394,174, now Patent No. 3,360,774, dated Dec. 26, 1967. Divided and this application Nov. 22, 1967, Ser. No. 685,114
Int. Cl. G11b *5/00*
U.S. Cl. 340—174.1 8 Claims

ABSTRACT OF THE DISCLOSURE

Apparatus is provided for the transfer of an information data signal having more bits than there are corresponding recording heads and tracks on the tape. Transfer of the information is accomplished by the successive recording of groups of bits which together comprise the information signal.

This application is a division of applicants' copending application Ser. No. 394,174, filed on Sept. 3, 1964 and entitled "Magnetic Tape Data Recording Methods and Apparatus," now U.S. Pat. No. 3,360,774.

This invention relates to magnetic tape recording apparatus for recording data on magnetic recording tape. The invention is especially useful in recording data obtained during various types of geophysical surveys, particularly, those conducted in boreholes drilled into the earth.

Most modern day magnetic tape recording systems for recording business and scientific data generally record the data at regularly spaced intervals along the tape while the tape is moved at a constant rate of speed. In some cases, such as telemetry real-time applications, the distance along the magnetic tape may have a physical significance in the sense that it represents the relative time of occurrence of the events or measurements that are recorded. In other cases, such as various business applications, the distance along the tape has no particular physical significance, the various groups and pieces of data instead being identified by various types of instruction signals and coded identification signals also recorded on the tape.

These known types of tape recording systems and methods do not always provide the best solution for a particular data recording situation. In some cases, these systems and methods are awkward and cumbersome to use, require more complex forms of apparatus than is desirable, require tedious and time-consuming operating procedures and intermediate steps, or, in some instances, do not provide the desired precision or accuracy.

An example of such a case is that of making geophysical measurements in boreholes drilled into the earth. Such boreholes are frequently drilled for purposes of discovering and producing subsurface hydrocarbon deposits, such as oil, gas, and the like. These boreholes extend anywhere from a few hundred feet up to 20,000 or more feet into the earth. For purposes of identifying the various subsurface earth strata and for determining whether they contain significant quantities of hydrocarbon fluid, it is customary to move one or more measuring devices through the length of the borehole and to record or log the measurements on either a photographic film or a strip chart which is moved in synchronism with the movement of the measuring device.

It can be appreciated that it might be useful to record such borehole measurements on magnetic tape. This, however, presents considerable problems. In such case, the borehole depth is an important parameter. Some way must be provided for subsequently identifying the borehole depths for the various increments of the recorded data. One approach would appear to be to provide some means for synchronizing the movement of the magnetic recording tape with the movement of the measuring device through the borehole. This, however, cannot very readily be done with available recording systems because such systems are usually designed to run at a constant or nearly constant speed while, for various practical reasons, the speed of the measuring device through the borehole may not be anywhere near constant.

It is an object of the invention, therefore, to provide new and improved magnetic recording apparatus for overcoming this difficulty.

In particular, it is an object of the invention to provide new and improved apparatus for recording on magnetic tape whereby the length along the tape can be made to represent some physical parameter other than time and where such physical parameter need not vary at a uniform rate. In the case of earth boreholes, the physical parameter is "borehole depth" and it is another object of the invention to provide new and improved apparatus for recording measurements made in a borehole drilled into the earth on magnetic recording tape where distance along the tape is proportional to distance along the borehole, even though the speed of movement of the measuring device may vary over a relatively wide range. This apparatus is also useful in non-borehole situations where the same general type of problem exists, namely, recording as a function of a variable parameter.

Another problem encountered in the borehole, as well as in various non-borehole cases, is that of comparing related data obtained at widely different times. In the borehole case, it is not uncommon to make different measurements on different trips through the borehole. It is then frequently desired to compare the different measurements obtained at the same depths even though made on different trips. Ideally, it would be desirable to record the measurements made on different trips in a side-by-side manner on the same recording medium. This, however, is difficult to do with conventional photographic or strip chart recorders. At first glance, it would appear equally as difficult, if not more so, for the case of magnetic tape. It is, however, a further object of the present invention to provide new and improved magnetic tape recording apparatus whereby measurements made at widely different times may be recorded adjacent to one another on the magnetic tape.

In some cases, it is desired to perform one or more computations on the measurements, either individually or in combination with one another, and to compare the results of such computations with one another or with the original data. Where, as in the case of borehole measurements, large numbers of such measurements are made over relatively long intervals of time, it would be desirable to perform such computations in an automatic manner and to record the results in step with the original data on the same recording medium. It is an additional object of the present invention, therefore, to provide new and improved apparatus for recording signals on magnetic tape which enables this purpose to be accomplished.

It is a further object of the invention to provide new and improved apparatus for interlacing data signals obtained at different times on one and the same magnetic recording tape during different trips along the tape.

In accordance with one feature of the present invention, there is provided magnetic tape recording apparatus for recording signals on a magnetic tape. Such apparatus comprises tape drive means for moving the magnetic tape past magnetic recording heads and electric motor means for actuating the tape drive means. The apparatus also includes energizing circuit means for supplying energizing current to the electric motor means. The apparatus further includes circuit means for disabling the energizing circuit means. In addition, the apparatus includes circuit means operative at the moment the energizing circuit means is disabled for momentarily supplying opposite polarity current to the electric motor means for rapidly halting the movement of the magnetic tape.

In accordance with another feature of the present invention, the magnetic tape recording apparatus includes a predetermined number of magnetic recording heads for recording signals in parallel tracks on the tape. The apparatus also includes a plurality of output circuit means individually adapted to supply signals to a different one of the recording heads. The apparatus further includes input circuit means for successively supplying plural bit digital data signals where the number of component bit signals in each digital data signal is greater than the predetermined number of recording heads. The apparatus also includes circuit means coupled to the input circuit means and operative at a first moment of time during the occurrence of each data signal for supplying a first group of the component bit signals to the output circuit means. The apparatus further includes circuit means coupled to the input circuit means and operative at a second and different moment of time during the occurrence of each data signal to supply a second group of the component bit signals to the output circuit means. This causes the component bit signals comprising each complete data signal to be recorded in successive groups on the magnetic tape.

In accordance with a further feature of the invention, the magnetic tape recording apparatus also includes magnetic reading head means for detecting digital signal indications recorded on the magnetic tape. The apparatus further includes signal reproducing circuit means coupled to the reading head means and responsive to detected digital signal indications to produce corresponding digital data pulses. The apparatus also includes circuit means responsive to each digital data pulse for suppressing the initial portion thereof, thereby to produce output signals which are less likely to include spurious impulse components.

For a better understanding of the present invention, together with other and further objects and features thereof, reference is had to the following description taken in connection with the accompanying drawings, the scope of the invention being pointed out in the appended claims.

Referring to the drawings.

Figure 1:
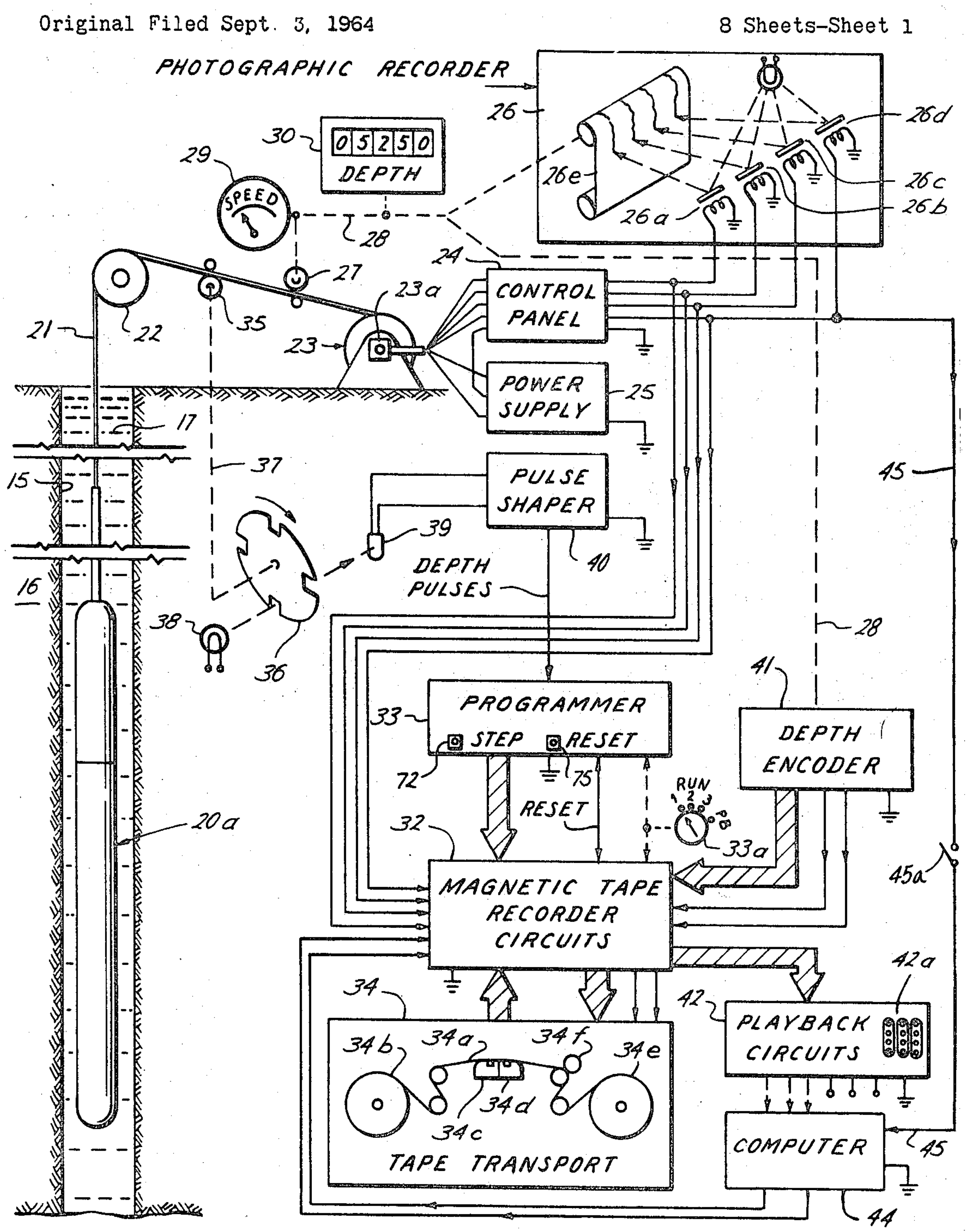
FIG. 1 shows in a schematic manner a borehole investigating system including a representative embodiment of magnetic tape recording apparatus constructed in accordance with the present invention.

Referring to FIG. 1, there is shown a representative embodiment of borehole investigating apparatus for conducting measurements in a borehole 15 which traverses various subsurface earth formations 16. The borehole 15 is filled with a drilling liquid or drilling mud 17. The borehole investigating apparatus includes a downhole instrument housing 20*a* which is suspended in the borehole 15 by means of an armored multiconductor cable 21. The instrument housing 20*a* includes therein or thereon one or more measuring devices for measuring different subsurface borehole conditions or characteristics of the subsurface earth formations. These devices may include various electrode arrays and coil arrays for measuring the electrical resistivities or conductivities of the subsurface earth formations, various sonic transducers for measuring sonic characteristics of the subsurface formations, or various radioactivity devices for measuring different nuclear phenomena in the borehole, or any combination of these or other borehole measuring devices. Specific examples will be considered hereinafter.

At the surface, the cable 21 passes over a sheave wheel 22 and is secured to a drum and winch mechanism 23. The drum and winch mechanism 23 includes a suitable brush and slip ring arrangement 23*a* for providing electrical connections between the cable conductors and a control panel 24 and a power supply 25. Power supply 25 supplies electrical power for operating the downhole measuring devices, while control panel 24 includes appropriate impedance matching circuits, sensitivity adjustments, disconnect switches, and the like, for the different measurement signals. The different measurement signals or data signals appearing at the output of control panel 24 are supplied to individual galvanometer elements 26*a*, 26*b*, 26*c*, and 26*d* of a photographic recorder 26. The photographic recording film 26*e* of redorder 26 is moved in synchronism with the movement of the downhole instrument housing 20*a* by means of a mechanical measuring wheel 27 which engages and is rotated by the cable 21 and a suitable mechanical linkage indicated by dash line 28. Linkage 28 also drives a speed indicator 29 and a mechanical counter 30, the latter being geared to provide indications of the depth of instrument housing 20*a* in the borehole 15.

The analog data signals appearing at the outputs of control panel 24 are also supplied to magnetic tape recorder circuits 32. Recorder circuits 32 operate under the control of a programmer 33 to convert the data signals to a binary form and to supply the resulting binary signals to a tape transport unit 34 at the appropriate moments for recording on a magnetic recording tape 34*a*. Magnetic tape 34*a* passes from a supply reel 34*b* over a set of seven side-by-side reading heads 34*c*, a set of seven side-by-side writing heads 34*d* and various idler wheels to a take-up reel 34*e*. Movement of the tape 34*a* is controlled by a drive capstan 34*f*. Programmer 33 is provided with a programmer control knob 33*a*.

Operation of the programmer 33 is synchronized with the movement of the downhole instrument housing 20*a* by means of a second measuring wheel 35 which engages cable 21 and which is used to drive a rotary shutter disc 36 by means of a mechanical linkage indicated by dash line 37. Shutter disc 36 is constructed of opaque material and has slots cut into the periphery thereof for periodically allowing a beam of light to pass from a lamp 38 to a photocell 39. Shutter disc 36 and mechanical linkage 37 are constructed to provide negligible loading on the measuring wheel 35. This minimizes errors due to cable slippage and the like, hence increasing the precision of the depth control.

The periodic electrical impulses generated by the photocell 39 are reshaped by a pulse shaper 40 and supplied to the programmer 33 for controlling the operation thereof. Pulse shaper 40 may take the form of a triggered pulse generator. Measuring wheel 35, shutter disc 36, and mechanical linkage 37 are constructed so that a depth pulse is generated each time the instrument housing 20*a* moves a distance of one-half of an inch in the borehole 15.

At periodic intervals on the magnetic tape 34*a* it is desired to record a data reading corresponding to the reading of the depth counter 30. To this end, the mechanical linkage 28 which drives the mechanical counter 30 also drives a depth encoder 41. Depth encoder 41 operates to produce a binary-coded decimal indication of the borehole depth value and to supply this indication to the recorder circuits 32.

The tape recording system of FIG. 1 also includes playback circuits 42 for later reproducing the various data signals recorded on the magnetic tape 34*a*. These playback circuits include appropriate means for separating the different data signals and supplying each individual data signal to a different output terminal. Also, each data signal is provided in both analog and digital form. Playback circuits 42 also include a set of binary indicator lamps 42*a* for providing a visible indication of the borehole depth values recorded on the magnetic tape.

The borehole investigating system of FIG. 1 also shows a computer 44. The use of such a computer is optional. It may be either an analog computer or a digital computer. There are several ways in which such a computer may be utilized. One way is represented by the electrical lead wire indicated by conductor 45 and switch 45*a*. When switch 45*a* is closed this represents the case where one of the analog data signals appearing at the output of control panel 24 is also supplied to the input of the computer 44. In this case, the computer 44 performs an appropriate computation on the data signal and then supplies the resulting computed signal to an additional input of the recorder circuits 32. In this manner, the computed data can be recorded on the magnetic tape 34*a* in step with the original data signals. Such computed signals may also be supplied to the photographic recorder 26 for producing additional traces on the recording film 26*e*.

Computer 44 can also be used during a subsequent playback of the tape 34*a*. In this case, playback circuits 42 reproduce the signals recorded at an earlier time and supply them to computer 44. The resulting computed signals can then be supplied to the recorder circuits 32 and recorded on the tape 34*a* in step with the original data.

Figure 2:
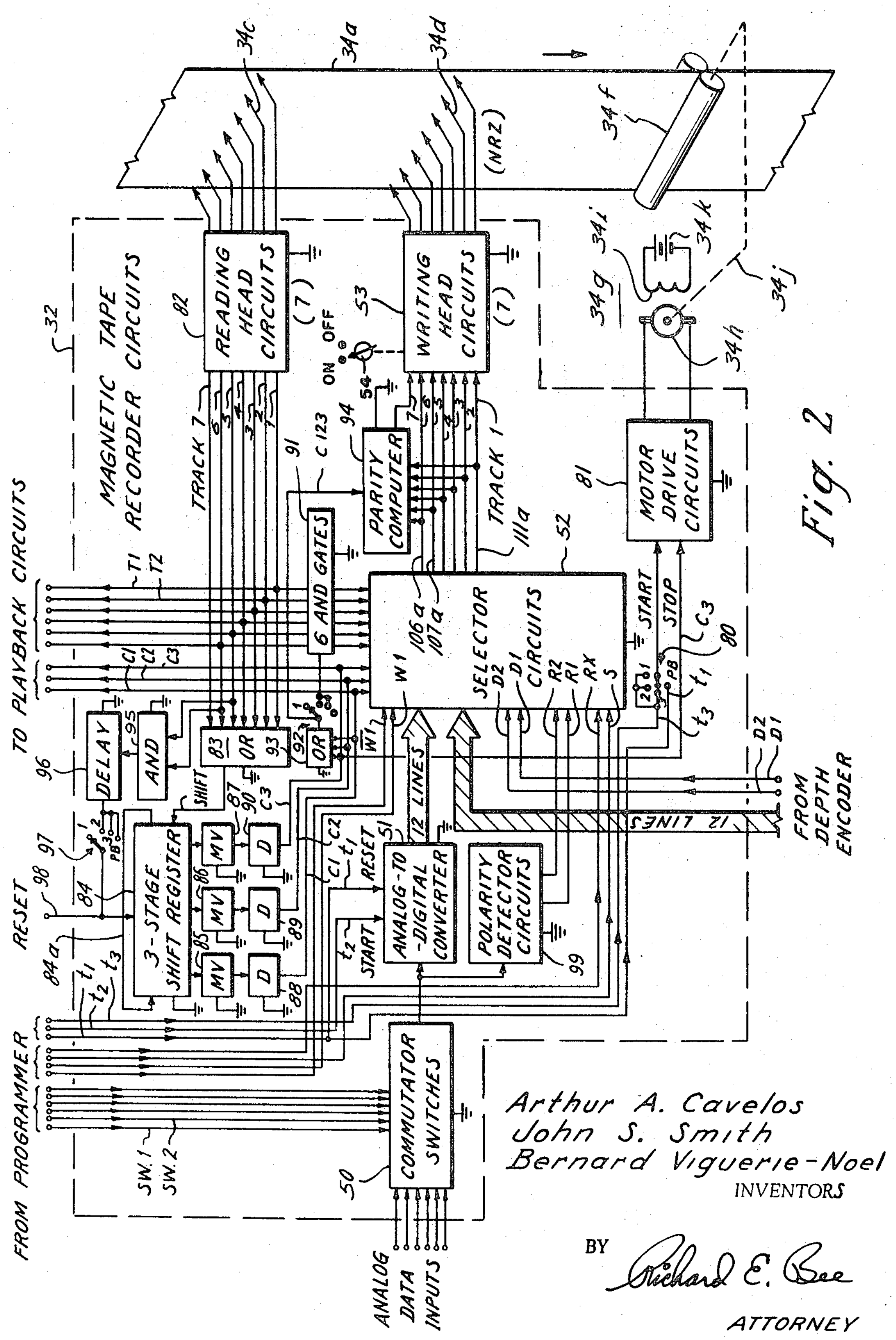
FIG. 2 shows in greater detail the construction of the magnetic tape recorder circuits of FIG. 1.

Referring now to FIG. 2 of the drawings, there is shown in greater detail the construction of the magnetic tape recorder circuits 32 of FIG. 1. There is also shown in greater detail a portion of the tape transport unit 34 of FIG. 1. In particular, the tape transport unit 34 is constructed to record data in seven parallel tracks along the length of the magnetic tape 34*a*. To this end, the seven magnetic reading heads 34*c* are arranged in a side-by-side manner across the width of the tape 34*a*. Similarly, the seven magnetic writing heads 34*d* are positioned in a side-by-side manner across the width of the tape 34*a*. The writing heads 34*d* are positioned on the downstream side of the reading heads 34*c*. The drive capstan 34*f* is driven by an electric motor 34*g* having a rotor member 34*h* and a field winding 34*i*. The rotor 34*h* is mechanically coupled to the drive capstan 34*f* by a suitable mechanical linkage indicated by dash line 34*j*. A battery 34*k* is used to energize the field winding 34*i*. Motor 34*g* is of the low inertia, high torque type to enable rapid starting and stopping thereof. A particularly suitable form of motor for this purpose is a so-called "printed-circuit motor" of the type described in U.S. Pat. No. 3,093,762. In such case, the stationary magnetic field may be produced by a suitable permanent magnet arrangement instead of a field winding and a battery.

The analog data signals from the control panel 24 of FIG. 1 are supplied to commutator switches 50 in the recorder circuits 32 as shown in FIG. 2. In the present embodiment, provision is made for handling six different data channels or sets of input data, consequently, six such switches are provided in unit 50. Under the control of switching signals (SW1, SW2, etc.) from the programmer 33, the individual ones of commutator switches 50 operate one at a time in a predetermined sequence to connect the different data input lines to the input of an analog-to-digital converter 51. The analog-to-digital converter 51 operates at the appropriate moments of time to convert each of these analog signals into a 12-bit parallel-type binary signal. Each of the twelve binary data bits appears on a different one of twelve parallel output lines which constitute the output of the converter 51. The resulting 12-bit binary words at the output of converter 51 are supplied to selector circuits 52. Selector circuits 52 operate to subdivide each 12-bit binary word into three successive groups or characters each containing four of the twelve binary bits. The resulting 4-bit binary character groups are then supplied by way of writing head circuits 53 to be recorded in tracks 1 through 4 of magnetic tape 34*a*.

Figure 3A:
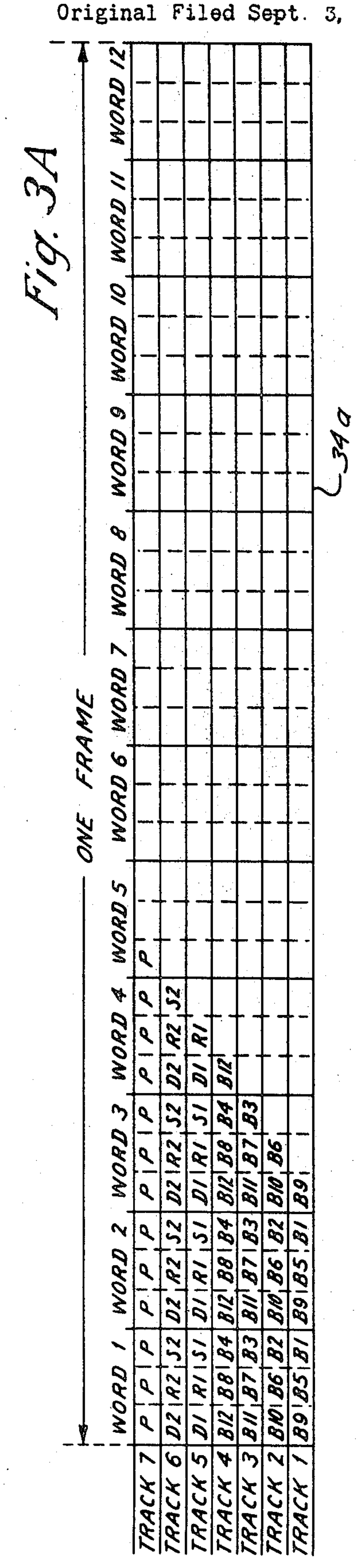
FIGS. 3A and 3B illustrate the format used in recording data on the magnetic tape.
Figure 3B:
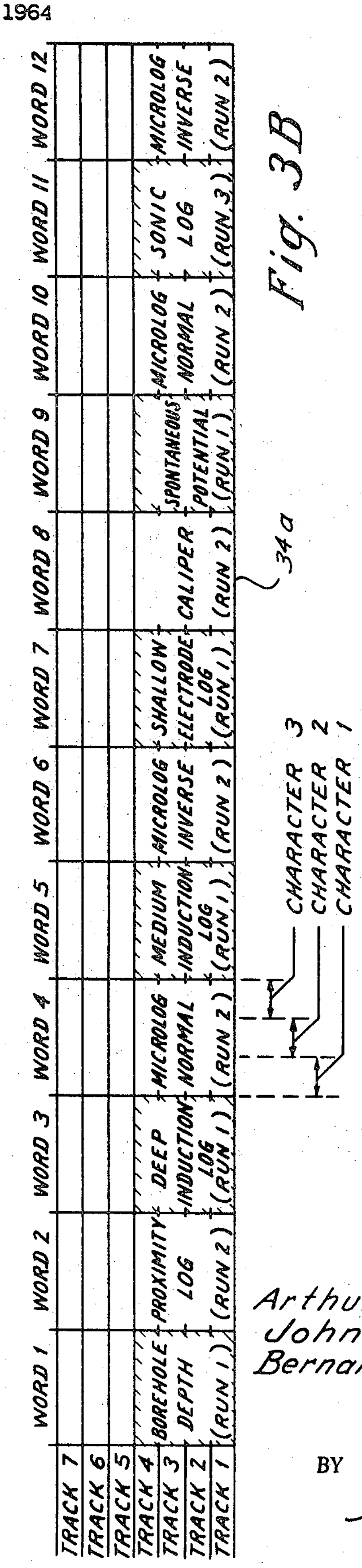

In order to better understand the operation of the apparatus, reference will now be had to FIGS. 3A and 3B which explain the manner in which the different pieces of data are to be arranged on the magnetic tape 34*a* (i.e., the tape "format"). FIG. 3A shows a short length of the magnetic tape 34*a*. The seven writing heads 34*d* are arranged to record bits of data in seven parallel tracks along the length of the tape. Predetermined lengths of tape are divided into primary intervals called "frames." FIG. 3A shows one complete frame. Each frame occupies a length of approximately 0.18 inch along the tape. This provides a bit density of 200 bits per inch. The process is repetitive and successive frames are placed one after the other along the entire length of the tape.

Each frame of data on the magnetic tape 34*a* is subdivided into twelve successive word groups or word intervals. Each word group is, in turn, subdivided into three successive character groups. The character group is the smallest grouping and is one bit interval in length (approximately 0.005 inch). Each character group or, simply, "character" consists of seven bits of binary data recorded in a side-by-side manner across the width of the magnetic tape 34*a*, one bit per track.

Figure 4:
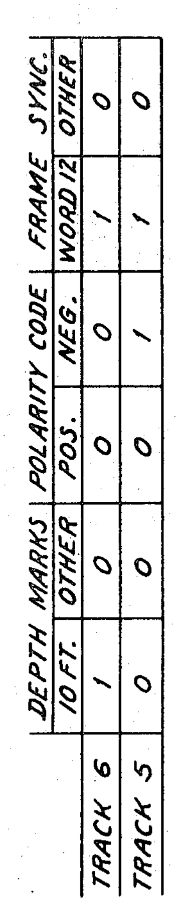
FIG. 4 is a chart explaining the different code variations used in the control tracks on the magnetic tape.

Each word group contains a complete data signal value together with various auxiliary signal indications. In particular, each 12-bit word coming out of the analog-to-digital converter 51 is recorded in a different word group on the tape 34*a*. These twelve data bits are designated as bit 1 (B1) through bit 12 (B12). Bit 12 is the most significant and bit 1 the least significant bit. Bits 9–12 are located in tracks 1–4 of character 1 of each word. Bits 5–8 are located in tracks 1–4 of character 2 of each word. Bits 1–4 are located in tracks 1–4 of character 3 of each word. Tracks 5 and 6 of each word contain various auxiliary-type control signals and identification signals. In particular, auxiliary bits D1 and D2 are used to provide borehole depth indications, bits R1 and R2 are used to provide polarity indications and bits S1 and S2 are used to provide a frame sync signal. The significance and binary codes used for these auxiliary signals are indicated in the chart of FIG. 4. Thus, a "0,1" binary pattern will appear at bit locations D1 and D2 whenever the borehole depth is an even multiple of 10 feet, otherwise, a "0,0" pattern appears. For bit locations R1 and R2, a binary pattern of "1,0" indicates that the numerical value recorded in bits B1–B12 is negative, while a binary pattern of "0,0" indicates that the numerical value is positive. Bit locations S1 and S2 are used for purposes of frame synchronization. A "0,0" binary pattern is recorded in the S1 and S2 locations for each of words 1–11, while a "1,1" pattern is recorded in the S1, S2 locations of word 12. This provides a means of identifying the end of a frame.

Track 7 on the magnetic tape 34*a* is used for purposes of recording parity indications (P). In particular, a binary "1" value is recorded in each track 7 bit location for which there is an even number of binary 1's in the other six tracks for that character. For this purpose, "zero" is taken as being an even number. Otherwise, if the number of 1's is odd, a binary "0" is provided in the track 7 bit location. Among other things, this means that there will be at least one binary "1" indication in each character column on the tape.

Since each frame contains twelve words, this means that the data signals from anywhere up to twelve different data sources can be recorded on a single tape. The twelve data bits in each word may be coded in an ordinary binary manner or in a binary-coded decimal manner.

In the present embodiment, word 1 is reserved for recording numerical indications of the borehole depth. This leaves eleven words for recording data signals from anywhere up to eleven different borehole measuing devices. A typical selection of measuring devices is indicated in FIG. 3B where the name of the device is written in the word location at which its signal is to be recorded. In this particular example, nine different measuring devices are to be used. Because of the nature of these particular measuring devices, it is not presently practical to incorporate all nine of them into a single downhole instrument housing. Instead, the measuring devices are separated into three groups and each group is incorporated in a separate downhole instrument housing. Each of the three instrument housings (designated 20*a*, 20*b* and 20*c*) is then used on on a separate trip through the borehole 15. The downhole instrument housing 20*a* used on the first trip includes a deep induction log device (e.g., U.S. Pat. No. 3,067,383), a medium induction log device (e.g., U.S. Pat. No. 2,-582,314), a shallow electrode-type logging device (e.g., U.S. Pat. No. 2,712,630), and a spontaneous potential measuring device (e.g., U.S. Pat. No. 1,913,293). The construction of instrument housings incorporating one or more of these different devices is described in U.S. Pat. No. 3,124,742 and in copending U.S. application Ser. No. 240,568, filed Nov. 28, 1962. Deep induction readings are recorded at word 3 of each frame, medium induction readings are recorded at word 5 of each frame, shallow electrode readings are recorded at word 7 of each frame, and spontaneous potential readings are recorded at word 9 of each frame.

After the borehole 15 has been explored to the extent desired with the first instrument housing 20*a*, such instrument housing is removed from the cable 21 and a second instrument housing 20*b* connected thereto for purposes of making further measurements in the borehole 15. In the present example, the measuring devices incorporated in the instrument housing 20*b* which is used on the second run through the borehole 15 include an electrode device known as a "proximity log" (e.g., U.S. Pat. No. 3,132,298), a microlog "normal" device (e.g., U.S. Pat. No. 2,669,688), a microlog "inverse" device (also U.S. Pat. No. 2,669,688) and a caliper device (e.g., U.S. Pat. No. 2,812,587). The same magnetic tape 34*a* used on the first trip is replayed during the second trip and proximity log readings are recorded on the tape 34*a* at word 2 of each frame, while the microlog "normal" readings are recorded at words 4 and 10 of each frame and the microlog "inverse" readings are recorded at words 6 and 12 of each frame. Caliper readings are recorded at word 8 of each frame.

After the desired measurements are made with the second instrument housing 20*b*, such instrument housing is removed from the cable 21 and a third instrument housing 20*c* connected thereto. In the present example, this third instrument housing 20*c* incorporates a sonic logging device (e.g., U.S. Pat. No. 2,938,592) for measuring acoustical properties of the subsurface formations. The instrument housing 20*c* incorporating this sonic logging device is then moved through the borehole 15 and, as the magnetic tape 34*a* is replayed, sonic measurements are recorded at word 11 of each frame.

In the present embodiment, the movement of a magnetic tape 34*a* is controlled so that the tape advances a distance of one frame as the downhole instrument housing moves a distance of 6 inches along the length of the borehole. This means that for a measuring device whose measurements are recorded once each frame that the signal from such device is sampled and recorded at 6-inch intervals along the borehole 15. For devices such as the microlog "normal" whose measurements are recorded twice each frame (words 4 and 10), this means that the signal from such device is sampled and recorded at 3-inch intervals along the borehole. This provides an adequate degree of resolution for borehole measurement purposes.

After the desired data signals have been recorded on the magnetic tape 34*a*, such tape may then be processed by a high-speed digital computer for automatically performing various interpretation procedures which provide more direct indications of the existence and quality of subsurface hydrocarbon deposits. The above-described tape format is compatible with the input requirements of various commercially-available general purpose digital computers. The magnetic tape 34*a* can also be kept for an almost indefinite period and, whenever necessary, used with a playback system including a graphic recorder for producing additional strip chart or photographic film logs.

Returning now to FIGS. 1 and 2, the manner of recording the data on the magnetic tape 34*a* will be considered in more detail. In accordance with one feature of the apparatus, the tape 34*a* is not moved in a continuous manner during the course of a borehole survey. Instead, the magnetic tape 34*a* is moved in a discontinuous step-wise manner. Each time the downhole instrument housing moves a distance of one-half an inch in the borehole 15, pulse shaper 40 produces a depth pulse. This depth pulse is used to drive the programmer 33 which, in turn, drives recorder circuits 32 and the tape transport 34 so as to advance the magnetic tape 34*a* a predetermined distance (one word or 0.015 inch) for each such depth pulse. After this, the magnetic tape 34*a* sits at rest until the occurrence of the next depth pulse. During each such movement of the magnetic tape 34*a*, one word of binary data is written on the tape 34*a*. Among other things, this discontinuous type of recording means that the recording process is not dependent on or adversely affected by the speed of the downhole instrument housing through the borehole 15.

Another feature of the apparatus is the provision of means whereby the different character groups recorded on the magnetic tape are uniformly and evenly spaced along the length of the tape. This purpose is accomplished by prerecording evenly spaced magnetic reference indications or reference marks along the length of the magnetic tape 34*a* before it is ever used to record any data signals. These prerecorded reference marks are then used to control the writing of the data bits on the magnetic tape so that these bits will be evenly spaced along the length of the tape.

In order to provide the prerecorded referenc marks, a precision, laboratory-type tape recorder which is designed to record data in seven parallel tracks is utilized. The magnetic tape 34*a* is first magnetically erased to make sure that it is perfectly clean. It is then run through the precision tape recorder at constant speed while timing pulses from a precision, laboratory-type pulse generator are supplied to the seven recording channels of such recorder. This provides parallel sets of evenly spaced magnetic reference marks in each of the seven tracks on the magnetic tape 34*a*. In the present embodiment, these magnetic reference marks are provided with the same spacing as is desired for the subsequent data signal character groups. As an alternative, the magnetic reference marks may be recorded in only a single track on the magnetic tape. There are, however, certain advantages to be gained from recording marks in all seven tracks.

The recording of precision reference marks on the magnetic tape does not work any great hardship, even though many different sets of the magnetic recording apparatus of the present invention may be in use in many different field locations throughout the world. This is because a single precision tape recorder at a single central location can be used to prerecord as many tapes as is desired and such prerecorded tapes subsequently shipped out to the various field locations. Thus, the prerecorded reference indications can be recorded under ideal conditions with high quality apparatus and there is no necessity for providing each of the many field locations with such high quality apparatus.

Figures 5, 6:
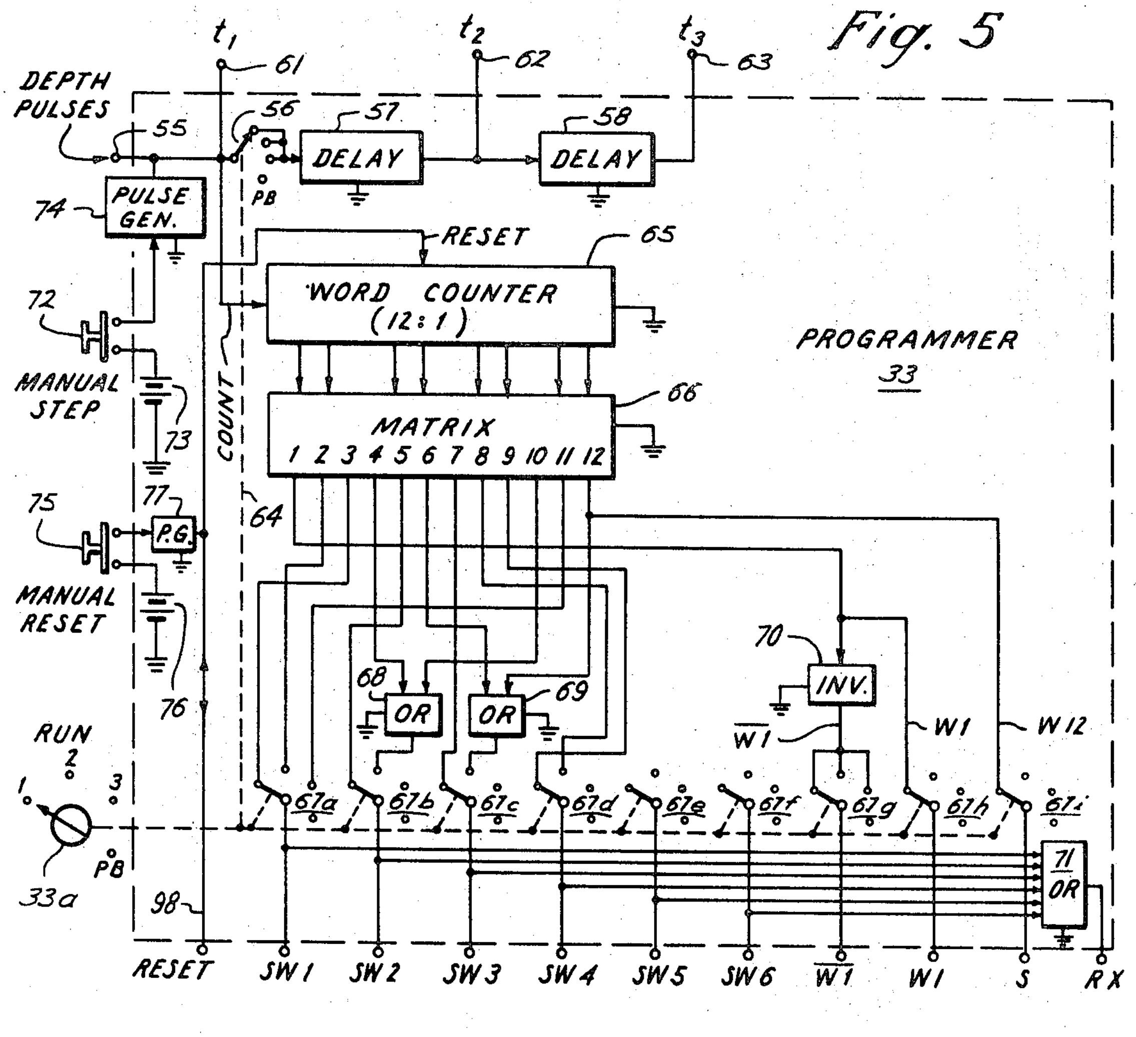
FIG. 5 shows in greater detail the construction of the programmer of FIG. 1.
FIG. 6 is a chart used to explain the programmer switch settings for a typical set of measurements.

Before going into greater detail on the recording process, reference will now be had to FIG. 5 of the drawings which shows the details of the programmer 33. Programmer 33 generates various timing signals and switching or gating signals which are used in the recording process. As shown in FIG. 5, the half-inch depth pulses from pulse shaper 40 are supplied to an input terminal 55 and then by way of a 4-position switch 56 to a time delay circuit 57 and then to a second time delay circuit 58. This provides three time-spaced timing pulses $t_1$, $t_2$ and $t_3$ which appear at respective output terminals 61, 62 and 63. These timing pulses are used in controlling various operations in the recorder circuits 32. The 4-position switch 56 is mechanically ganged to the programmer control knob 33*a* as indicated by dash line 64. The four positions for the control knob 33*a*, as well as the switch 56, are designated as run 1, run 2 and run 3 positions and a playback (PB) position. The "runs" refer to different trips through the borehole. In some respects it may be more accurate to say that the first three positions represent "runs" along the magnetic tape, instead of in the borehole, since, in some instances, one or more of the runs might be used only for purposes of recording computed data on the tape.

The depth pulses supplied to input terminal 55 are also supplied to the counting input of a twelve-to-one word counter 65. Since one word is written for each depth pulse and since there are twelve words per frame, one complete cycle of the counter 65 corresponds to the recording of one complete frame of data on the magnetic tape. Counter 65 drives a matrix circuit 66 having twelve individual output lines, one for each word. For any given count in the counter 65, the corresponding one of the output lines of matrix 66 is energized to provide a gating signal. The various word gating signals from matrix 66 are supplied in different combinations to different ones of a series of 4-position selector switches 67*a*–67*i*. Each of selector switches 67*a*–67*i* is ganged to the control knob 33*a*. The first six of these selector switches, namely switches 67*a*–67*f*, are used to provide switching signals, designated as SW1 through SW6, which are used to control individual ones of the commutator switches 50 shown in FIG. 2. Thus, whenever a gating signal appears at one of the switching signal output terminals SW1–SW6, then a corresponding one of commutator switches 50 will be closed to enable the passage of an analog data signal to the analog-to-digital converter 51.

The particular choice of interconnections between the matrix 66 and the selector switches 67*a*–67*f* depends on which data signals are connected to which input lines of commutator switches 50 and on the word locations on the tape at which it is desired to record the different data signals. The particular example illustrated in FIG. 5 corresponds to that set forth in the table of FIG. 6. The designation "IL–D" refers to the "deep induction log," while "IL–M" refers to the "medium induction log," "EL–S" refers to the "shallow electrode log," and "SP" refers to "spontaneous potential." "PL" designates "proximity log," "ML–N" designates "microlog normal," and "CAL," designates "caliper."

For those cases where a given data signal is recorded two or more times each frame, then an appropriate OR circuit may be used to supply two or more of the word gate signals from matrix 66 to the appropriate switching signal output line. This is indicated in FIG. 5 for the microlog "normal" (ML–N) and the microlog "inverse" (ML–I) signals by the OR circuits 68 and 69, respectively. Thus, for example, when the selector switch 67*b* is in position 2 (run 2), OR circuit 68 operates to supply both the word 4 gating signal and the word 10 gating signal to the output line SW2, it being assumed that the microlog "normal" signal is being supplied to the second of the commutator switches 50.

Additional control signals for the recorder circuits 32 are provided at the output terminals of programmer 33 designated $\overline{W1}$, W1, S, and RX. The $\overline{W1}$ terminal is coupled by way of selector switch 67*g* and an inverter circuit 70 to the word 1 output line of matrix 66. This provides a $\overline{W1}$ output (*not* word 1) whenever the count in word counter 65 is at other than word 1. The W1 terminal, on the other hand, is connected during run 1 by way of selector switch 67*h* to the word 1 line of matrix 66. This provides an output gating signal during the occurrence of word 1. The S output terminal is coupled during run 1 by way of switch 67*i* to the word 12 output of matrix 66. This S output is used for purposes of generating the frame sync signal which is recorded in character 3 of word 12 of each frame. The RX terminal is connected by way of an OR circuit 71 to the output lines for each of the first six selector switches 67*a*–67*f*. The gating signals appearing at the RX terminal provide an indication as to when a new word is being written on the magnetic tape.

Programmer 33 also includes a manual push-button switch 72 for enabling the operator to manually advance the magnetic tape. Switch 72 connects a battery 73 to the trigger input of a pulse generator 74. Pulse generator 74 is responsive to the momentary closing of the switch 72 to generate a narrow output pulse similar to the externally-supplied depth pulses.

Programmer 33 further includes a manual push-button switch 75 for enabling the operator to generate a reset pulse whenever this is desired. To this end, the switch 75 operates to connect a battery 76 to the trigger input of a pulse generator 77. In response thereto, pulse generator 77 generates a narrow reset pulse. Among other things, this reset pulse is used to reset the word counter 65. This may be done, for example, at the beginning of a borehole survey so that the first word recorded on the magnetic tape will be word 1.

Figure 7:
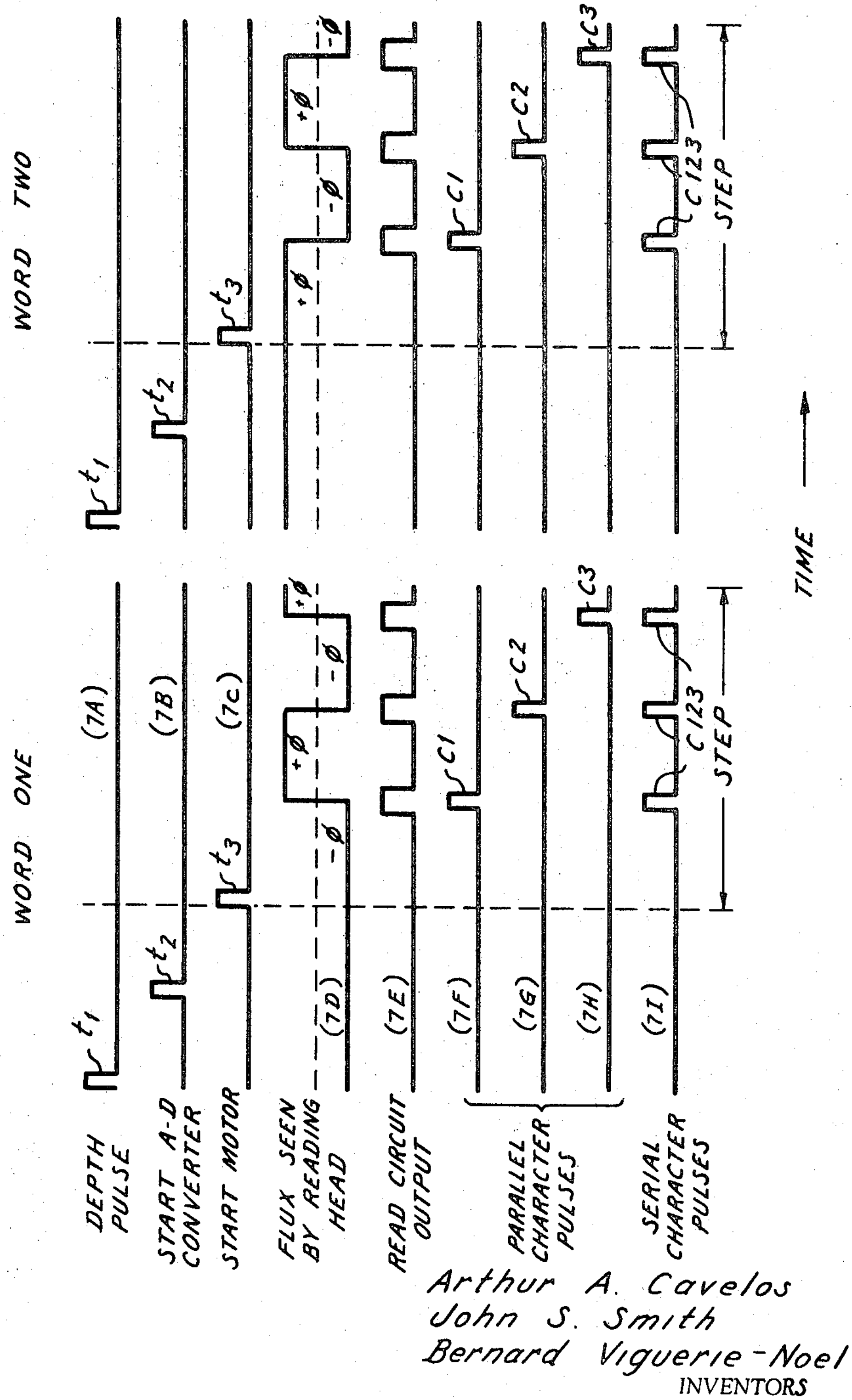
FIG. 7 is a timing diagram used in explaining the operation of the recording system.

Returning now to FIG. 2 of the drawings, the description of the recorder circuits 32 will be continued and the operation thereof explained with the aid of the waveforms of FIG. 7. The basic timing signals which control the primary operations in the recorder circuits 32 are the $t_1$, $t_2$ and $t_3$ timing signals supplied thereto from the programmer 33. These signals are represented by waveforms 7A, 7B and 7C of FIG. 7. FIG. 7 shows the waveforms for two successive words, in this case, word 1 and word 2. Timing signal $t_1$ is, in actuality nothing more than the half-inch depth pulse supplied by the pulse shaper 40. Timing pulses $t_2$ and $t_3$ are pulses produced at fixed predetermined time intervals after the occurrence of the half-inch depth pulse. These time intervals are determined by the delay units 57 and 58 (FIG. 5) which provide fixed time delays.

The $t_1$ timing pulse is supplied to the reset terminal of the analog-to-digital converter 51 (FIG. 2) and serves to reset such converter 51 to an initial or "zero" condition. At the sime time, the $t_1$ pulse is supplied to the word counter 65 of programmer 33, which, for the moment, is assumed to cause a particular one of the commutator switches 50 to be closed by the appropriate one of switching gate signals SW1, SW2, etc. A short time thereafter, the $t_2$ timing pulse is supplied to the start terminal of converter 51 to initiate the analog-to-digital conversion process therein. After a fixed interval of time sufficient to complete the conversion process, the $t_3$ timing pulse is produced and supplied by way of a 4-position switch 80 (mechanically ganged to control knob 33*a*) to the start terminal of motor drive circuits 81. This activates the motor 34*g* and causes the magnetic tape 34*a* to advance. At the same time, the 12-bit digital signal appearing at the output of converter 51 is supplied by way of selector circuits 52 and writing head circuits 53 to the seven writing heads 34*d* and the various bits of the digital signal are recorded on the magnetic tape 34*a*. After the tape 34*a* has advanced a predetermined distance, the motor 34*g* is stopped and the system sits at rest until the next cycle of operation is initiated by the next half-inch depth pulse.

An important feature of the present invention relates to the manner in which the tape 34*a* is stopped after a word is written. In the present embodiment, this is done during run 1 by sensing the prerecorded reference marks on the tape 34*a* and stopping the movement of the tape 34*a* after three successive character intervals have been detected. (During subsequent runs, the data indications are used for this purpose.) Thus, the tape 34*a* is advanced three bit intervals or character intervals for each half-inch depth pulse (or $t_1$ timing pulse). The prerecorded reference marks are detected by the magnetic reading heads 34*c*. The form of recording used on the tape 34*a* is a "non-return-to-zero" (NRZ) type of recording where a reversal of the magnetic flux polarity on the tape 34*a* is used to represent a binary "one" value. The absence of such a flux reversal, on the other hand, indicates the occurrence of a binary "zero" value.

The magnetic flux seen by each of the reading heads 34*c* is indicated by waveform 7D of FIG. 7 for the case of the prerecorded reference marks. Thus, during the tape movement ("step" interval following $t_3$), alternate positive-going and negative-going flux transitions are seen by the reading heads 34*c*. This produces alternate positive-going and negative-going voltage impulses across the output winding of each of the seven reading heads 34*c*. Each reading head 34*c* is connected to an individual one of seven reading head circuits 82. As will be seen in connection with FIG. 9, the impulses from each reading head 34*c* are shaped and converted to pulses of the same polarity by a different one of the reading head circuits 82. The resulting pulses appearing at the output of each of the reading circuits 82 are represented by waveform 7E. Since prerecorded reference marks are recorded in each of the seven tracks on the tape 34*a*, pulses corresponding to waveform 7E (except for spurious time delays) appear on each of the seven output lines coming from the different ones of the seven reading head circuits 82.

The seven output lines from reading head circuits 82 are connected to the seven inputs of an OR circuit 83. The output of OR circuit 83 is connected to the shift input of a 3-stage shift register 84. The leading edge of the first pulse in each character group to reach the shift register 84 serves to shift a binary "one" indication from one stage to the next in the shift register 84. Register 84 is provided with a feedback line 84*a* so that this "one" indication can be fed back from the last register stage to the first. Initially, register 84 is set (or reset) so that the binary "one" is in the last or character 3 stage. Three one-shot multivibrators 85, 86 and 87 are individually connected to different ones of the three stages in the shift register 84. Each of these multivibrators 85, 86 and 87 is connected so that it will be triggered whenever the binary "one" is transferred to the register stage to which it is connected. When triggered, each of the multivibrators 85, 86 and 87 produces a relatively narrow output pulse. These output pulses are supplied by way of individual time delay units 88, 89 and 90, respectively, to provide the parallel character pulses represented by waveforms 7F, 7G and 7H of FIG. 7. Thus, when the binary "one" is shifted to the first stage of register 84, multivibrator 85 is triggered to produce a first character pulse (C1) as represented by the waveform 7F at the output of delay unit 88. When the binary "one" is shifted to the second stage in register 84, multivibrator 86 is triggered to produce a second character pulse (C2) represented by waveform 7G at the output of delay unit 89. Similarly, when the binary "one" is shifted to the third stage of register 84, the third multivibrator 87 is triggered to produce a third character pulse (C3) represented by waveform 7H at the output of delay unit 90. Delay units 88, 89 and 90 provide relatively short time delays which enable the character pulses C1, C2 and C3 to be approximately centered with respect to the pulses coming from the reading head circuits 82 (waveform 7E).

The occurrence of a C3 character pulse at the output of delay unit 90 indicates that three successive character groups have been detected on the magnetic tape 34*a*. Consequently, this C3 character pulse is supplied to the "stop" terminal of motor drive circuits 81. Almost immediately thereafter, the movement of the tape 34*a* is stopped. Both the magnetic tape 34*a* and the recorder circuits 32 will then remain at rest until the occurrence of the next half-inch depth pulse, at which time the same process will be repeated for the next word.

In order to rewrite data signals, previously recorded on the magnetic tape 34*a* during an earlier run, the six output lines from the reading head circuits 82 for tracks 1–6 are also connected by way of six individual AND gates 91 to another set of input terminals for selector circuits 52. The operative condition of AND gates 91 is controlled by a 4-position switch 92 which is located between AND gates 91 and an OR circuit 93. Switch 92 is mechanically ganged to control knob 33*a* (FIG. 1). OR circuit 93 is provided with three input terminals which are connected to the outputs of the three delay units 88, 89 and 90. This provides at the output of the OR circuit 93, a group of three serial character pulses (designated "C123") for each cycle of operation. These serial character pulses are represented by waveform 7I of FIG. 7.

The recorder circuits 32 also include a parity computer 94 which is constructed to provide a parity signal for recording in track 7 whenever the number of "one" bits to be recorded in the other six tracks is even. The serial character pulses C123 are also supplied from the output of OR circuit 93 to the parity computer 94 to control the timing of the parity pulses appearing at the output of such parity computer.

Recorder circuits 32 further include a 2-input AND circuit 95 which is coupled to the track 5 and track 6 lines coming from the reading head circuits 82. AND circuit 95 is used, on other than the first run, to recognize the occurrence of frame sync signals in character 3 of word 12. When such signals are recognized, AND circuit 95 provides an output pulse which is supplied during other than run 1 by way of a delay unit 96 and a 4-position switch 97 to the reset terminal of the shift register 84. This provides continuous synchronization, once each frame, for the shift register 84 during second and later replays of tape 34*a*. Switch 97 is mechanically ganged to the main control knob 33*a* (FIG. 1). Delay unit 96 provides a short time delay so that a reset pulse will not reach the register 84 at the same moment as does a shift pulse from OR circuit 83. Reset pulses from the delay unit 96 are also supplied to the word counter 65 of programmer 33 (FIG. 5) during the second and subsequent runs by way of line 98.

Recorder circuits 32 also include polarity detector circuits 99. These polarity detector circuits 99 are coupled to the common output line from commutator switches 50 and serve to provide an output indication (lines R1 and R2) which indicates the polarity of the signal which is at that moment being supplied to the input of the analog-to-digital converter 51. Such circuits 99 may be omitted where signals of only a single polarity are to be recorded.

Figure 8:
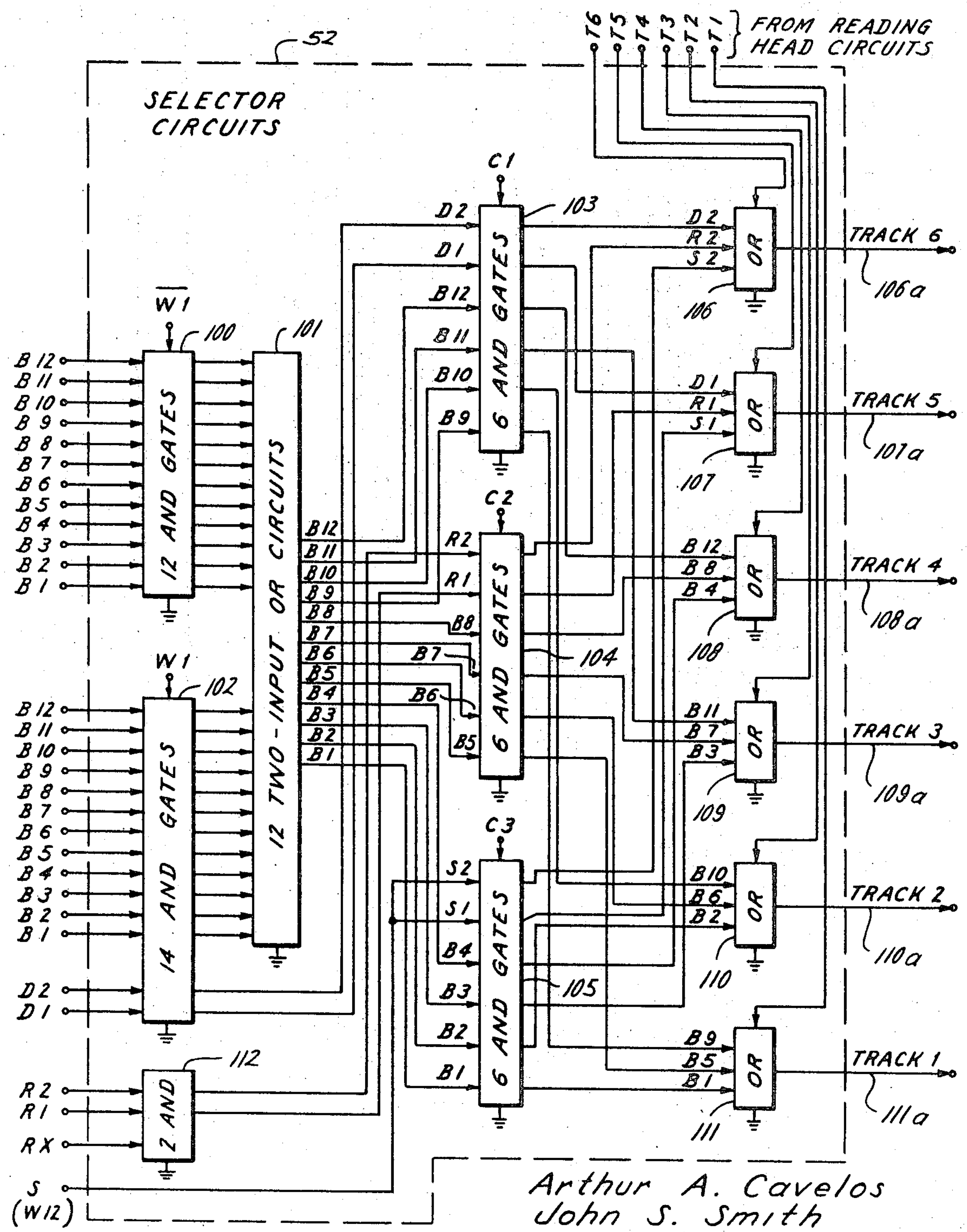
FIG. 8 shows in greater detail the construction of the selector circuits of FIG. 2.

Referring now to FIG. 8 of the drawings, there is shown in greater detail the construction of selector circuits 52 which are used in the recorder circuits 32 (FIG. 2) to select which of various signals will be supplied to the writing head circuits 53 for recording on the magnetic tape 34*a*. The twelve parallel bit lines (B1–B12) from the analog-to-digital converter 51 are coupled by way of twelve individual AND gates 100 to the first inputs of twelve individual OR circuits 101 as shown in FIG. 8. In a similar manner, the twelve parallel bit lines (B1–

B12) from the depth encoder 41 (FIG. 1) are coupled by way of twelve individual ones of fourteen AND gates 102 to the second inputs of the twelve individual OR circuits 101. A gating signal $\overline{W1}$ (*not* word 1) is supplied to each of the individual AND gates 100 whenever the word to be recorded on the tape is other than word 1. This enables the twelve binary bit signals (B1–B12) to pass through the individual AND gates 100 and the individual OR circuits 101 and appear on the twelve output lines (B1–B12) of such OR circuits 101.

A W1 (word 1) gating signal is supplied to each of the fourteen AND gates 102 during the occurrence of word 1. Such signal enables passage of the twelve binary bit signals (B1–B12) received from the depth encoder 41 through AND gates 102 and OR circuits 101 to the twelve output lines (B1–B12) of the OR circuits 101. Auxiliary depth indication signals D1 and D2 from the depth encoder 41 are supplied by way of the remaining individual ones of the AND gates 102 to the remainder of the selector circuits 52. The W1 and $\overline{W1}$ gating signals are obtained from the programmer 33 (FIG. 5) at the appropriate moments of time.

Since it is desired to record the twelve bits of each binary word in three successive character positions on the magnetic tape 34*a*, it is necessary to separate these bits into three groups which are supplied one after the other in succession to the writing head circuits 53. This separation into character groups is provided by three sets of AND gates 103, 104 and 105, as shown in FIG. 8. These sets of AND gates or "character" gates 103, 104 and 105 are also used to separate the various auxiliary signals and place them in the appropriate character groups. Operation of these character gates 103, 104 and 105 is controlled by the character pulses C1, C2 and C3 obtained from delay units 88, 89 and 90 (FIG. 2). During the occurrence of the C1 character pulse, for example, each one of the six AND gates 103 is interrogated by the C1 pulse and an output pulse appears at the output of any of these gates for which the signal input is at the binary "one" level. Otherwise, AND gates 103 remain inactive and no signals pass therethrough. The other AND gates 104 and 105 operate in a similar manner during their respective C2 and C3 time intervals.

There are supplied as input signals to the six individual AND gates 103, binary signals for data bits B9 through B12 and auxiliary depth indication bits D1 and D2. As seen from FIG. 3A, these are the bit indications which it is desired to record in character 1 of each word. The resulting binary pulse indications produced at the outputs of AND gates 103 during the occurrence of the C1 character pulse are supplied to individual ones of six output OR circuits 106 through 111. The outputs of OR circuits 106–111 are connected to corresponding ones of the six track lines 106*a*–111*a* running to the writing head circuits 53.

The six input signals for the C2 AND gates 104 are the binary signals for data bits B5–B8 and auxiliary polarity indicating bits R1 and R2. The binary signals for polarity bits R1 and R2 are supplied by way of a pair of individual AND gates 112. These polarity signals are obtained from polarity detector circuits 99 (FIG. 2) while a polarity gating signal RX is obtained from programmer 33. The purpose of the RX gating signal is to prevent the passage of any polarity signals through AND circuits 112 whenever a previously recorded word is being rewritten on the magnetic tape 34*a*. The six individual output lines from AND gates 104 are also connected by way of the six output OR circuits 106–111 to the writing head track lines for tracks 1–6.

The six input signals for the C3 AND gates 105 are the binary signals for data bits B1–B4 and auxiliary frame sync bits S1 and S2. The resulting output binary pulse indications produced during the occurrence of the C3 character pulse are supplied to the six output OR circuits 106–111 and from there to the track 1–6 lines running to the writing head circuits 53. The auxiliary frame sync signals for bits S1 and S2 are obtained from the gating signal S supplied by the programmer 33 (FIG. 5). This gating signal is at the binary "one" level during the occurrence of word 12.

Since it is, at times, desired to rewrite data previously recorded on the magnetic tape 34*a*, the six data and auxiliary signal lines from the reading head circuits 82 (tracks 1–6) are also individually coupled to different ones of the output OR circuits 106–111.

As seen from the foregoing, the signals supplied by the selector circuits 52 to the writing head circuits 53 may be obtained from any one of three different principal sources, namely, the analog-to-digital converter 51, the depth encoder 41, or the reading head circuits 82.

Figure 9:
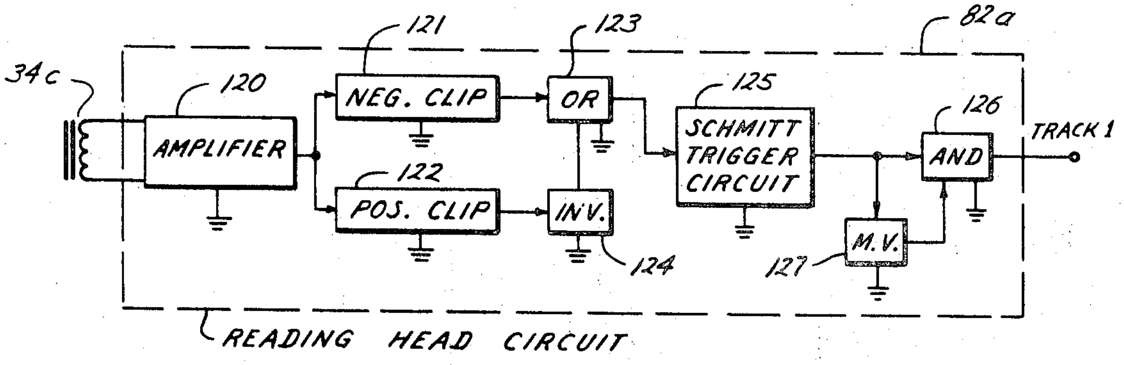
FIG. 9 shows in greater detail the construction of one of the reading head circuits of FIG. 2.

Referring now to FIG. 9 of the drawings, there is shown in greater detail the construction of an individual one of the reading head circuits 82. In particular, FIG. 9 shows the reading head circuit 82*a* for track 1 on the tape. The reading head circuits for the other tracks are of this same construction. As seen in FIG. 9, the magnetic reading head 34*c* for track 1 is connected to the input of an amplifier 120. The output of amplifier 120 is coupled to both a negative clipping circuit 121 and a positive clipping circuit 122. Negative clipping circuit 121 removes any negative-going pulses and passes only positive-going pulses to an OR circuit 123. Positive clipping circuit 122, on the other hand, removes any positive-going pulses and passes only negative-going pulses to an inverter circuit 124. Inverter circuit 124 inverts the polarity of the negative pulses supplied thereto and supplies the resulting positive pulses to a second input of the OR circuit 123. The output of OR circuit 123 is connected to the input of a Schmitt trigger circuit 125. Schmitt trigger 125 operates to reshape the pulses supplied thereto to provide at the output thereof a corresponding train of pulses of more nearly rectangular waveform. The output of Schmitt trigger 125 is coupled to a first input of an AND circuit 126. The output of Schmitt trigger 125 is also coupled to the triggering input of a one-shot multivibrator 127. Multivibrator 127 is triggered by the leading edge of any pulse from Schmitt trigger 125 and operates to generate a relatively narrow, negative-going pulse each time it is triggered. These narrow negative-going pulses are supplied to a second input terminal of the AND circuit 126. The negative-going pulses from multivibrator 127 are considerably narrower than the desired signal pulses appearing at the output of Schmitt trigger 125. The negative-going pulses serve to disable AND circuit 126 during the initial portion of each desired signal pulse appearing at the output of Schmitt trigger 125. As a consequence, only the latter portions of the desired signal pulses appear at the output of AND circuit 126. The purpose of this cancellation feature is to eliminate undesired spurious impulses which may be picked up by the reading head 34*c* because of a simultaneous recording of a signal indication by a nearby recording head or writing head 34*d*. These spurious "cross-talk" impulses are of relatively short duration compared to the desired signal pulses sensed by the reading head 34*c*.

Figure 10:
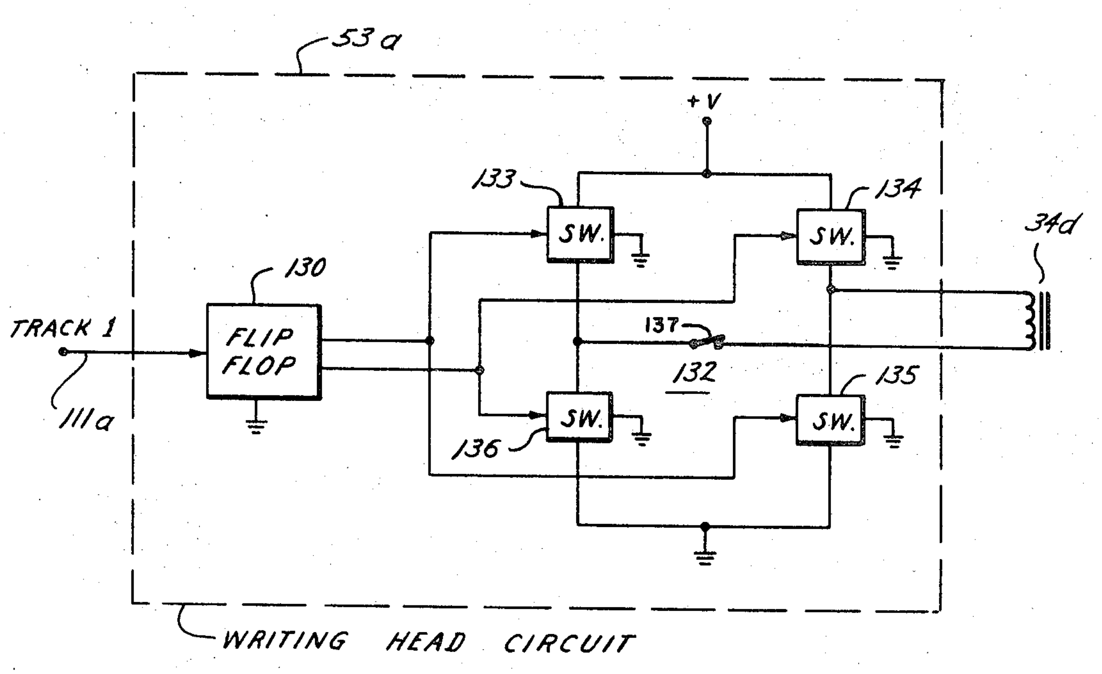
FIG. 10 shows in greater detail the construction of one of the writing head circuits in FIG. 2.

Referring now to FIG. 10 of the drawings, there is shown in greater detail the construction of an individual one of the writing head circuits 53 of FIG. 2. In particular, there is shown writing head circuit 53*a* for track 1 on the magnetic tape 34*a*. The writing head circuits for the other six tracks on the tape are of the same construction. The binary data line 111*a* coming from the selector circuits 52 is coupled to the trigger input of a flip-flop circuit 130, as shown in FIG. 10. This flip-flop circuit 130 controls a bridge-type switching network 132 which, in turn, determines the direction of current flow through the coil of writing head 34*d* of track 1. The switching network 132 includes four individual switching circuits or devices 133, 134, 135 and 136 which are located in the four arms of the bridge network. The writing head 34*d* is connected across one diagonal of the bridge, while a voltage source +V is connected across the other diagonal of the bridge. Each of the individual switching circuits 133–136 may be a vacuum tube switching circuit, a transistor switching circuit, or, in some cases, may take the form of electromechanical relays.

When flip-flop circuit 130 is in a first of its two stable states, switch circuits 133 and 135 are rendered conductive while the other switch circuits 134 and 136 remain nonconductive. As a consequence, current flows from the voltage source +V through the switch circuit 133, the coil of writing head 34*d* and the switch circuit 135 to ground. When the flip-flop circuit 130 is in the second of its stable states, then the situation is reversed. In this latter case, switch circuits 134 and 136 are conductive and switch circuits 133 and 135 are nonconductive. Thus, current will now flow from the source +V, through switch 134, writing head 34*d* and switch 136 to ground. In this second case, the direction of current flow through the coil of writing head 34*d* is just the opposite of what it was in the first case. The reversal of current flow through the writing head 34*d* produces a flux transition on the magnetic tape 34*a* and this flux transition is used to represent the occurrence of a binary "one" value. The flip-flop circuit 130 responds to the leading edge of each positive-going pulse which is supplied thereto in line 111*a* and each such leading edge causes the flip-flop 130 to change from one stable state to the other.

A mechanical switch 137 is provided in series with the writing head 34*d* to disable the writing head 34*d* during a tape playback operation for which it is not desired to record any data on the tape 34*a*. Switch 137 is mechanically ganged to the control knob 54 (FIG. 2). Switch 137 is closed when knob 54 is in the "on" position and open when knob 54 is in the "off" position.

Figure 11:
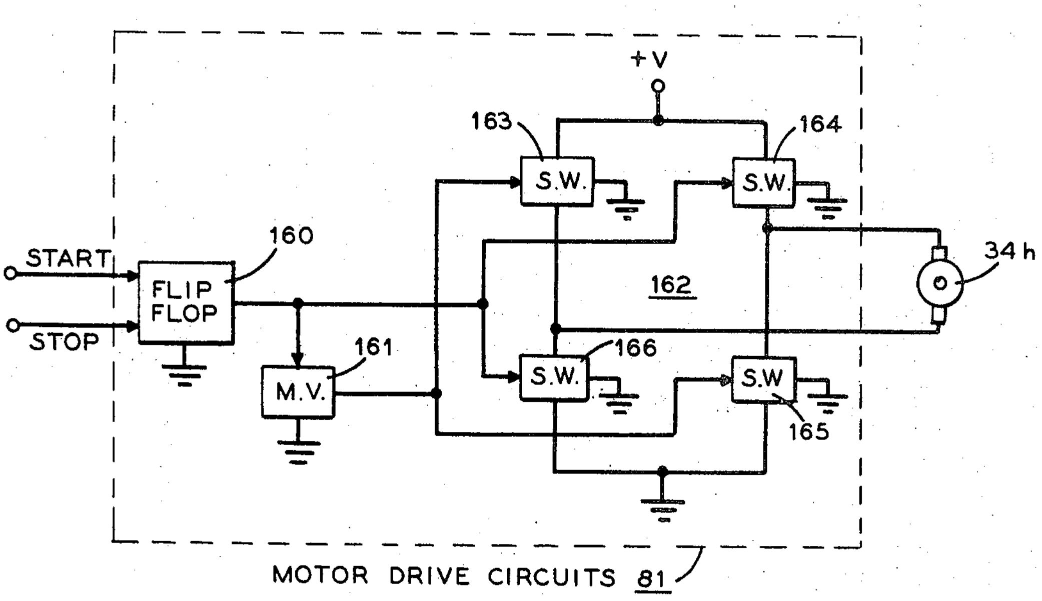
FIG. 11 shows in greater detail the construction of the motor drive circuits of FIG. 2.

Referring now to FIG. 11 of the drawings, there is shown in greater detail the construction of motor drive circuits 81 of FIG. 2. As seen in FIG. 12, the "start" and "stop" signals are supplied to the two sides of a flip-flop circuit 160. The flip-flop 160, in conjunction with a one-shot multivibrator 161, is used to control a bridge-type switching network 162 having the motor armature 34*h* coupled across one diagonal of the bridge and a source of voltage +V coupled across the other diagonal of the bridge. The switching network 162 includes individual switching circuits 163, 164, 165 and 166 located in the four arms thereof. These switching circuits 163–166 may be of either the vacuum tube, transistor or relay type.

The application of a "start" pulse ($t_1$ or $t_3$) to the flip-flop 160 causes the output of flip-flop 160 to go from a low voltage level (e.g., zero volts) to a high voltage level. The application of a "stop" pulse (C3) to the flip-flop 160 causes the output to return from the high voltage level to a low voltage level. The high voltage level at the output of flip-flop 160 following the application of a "start" pulse serves to activate switches 164 and 166 and render these switches conductive. This enables current to flow from the source +V, through the switch 164, the motor armature winding 34*h* and the switch 166 to ground. This causes the armature 34*h* to rotate and advance the magnetic tape 34*a* in a forward direction.

The negative-going transition appearing at the output of flip-flop 160 when the "stop" pulse is applied serves to trigger the one-shot multivibrator 161. In response thereto, the multivibrator 161 produces a short duration pulse which is used to activate switches 163 and 165 for a short interval of time. During this interval, current flows from the source +V, through the switch 163, the armature 34*h* and the switch 165 to ground. This current flows in a reverse direction through the armature 34*h*. This momentary reverse current flow serves to brake or stop the movement of the armature 34*h* in a more rapid manner. Since the inertia of the armature 34*h* is relatively small, such armature and, consequently, the magnetic tape 34*a* is brought to rest quite quickly. In fact, it has been found that the magnetic tape 34*a* can be brought to rest within one-third of a character interval following the application of a "stop" pulse to the flip-flop 160.

Considering now the general operation of the magnetic tape recording system of FIGS. 1–11 as a whole and referring first to FIG. 1, a magnetic tape 34*a* having evenly spaced precorded reference indications recorded in the seven tracks thereof is placed on the tape transport 34 in an initial position, usually with most of the tape located on the supply reel 34*b*. A first downhole instrument housing 20*a* is connected to the cable 21 and lowered to the bottom of the borehole 15. In the present example, this first instrument housing 20*a* includes a deep induction log exploring device, a medium induction log exploring device, a shallow electrode log exploring device, and a spontaneous potential measuring device. During the downward descent of the instrument housing 20*a*, the programmer 33 is disconnected from the pulse shaper 40 and the recorder circuits 32 are disconnected from the control panel 24 so that no movement of or recording on the magnetic tape 34*a* takes place during this time. When the instrument housing 20*a* has reached the lowermost depth of interest in the borehole 15 and it is desired to commence the borehole survey, the programmer 33 is reconnected to the pulse shaper 40 and the recorder circuits 32 are reconnected to the control panel 24, as illustrated in FIG. 1. The programmer control knob 33*a* is set to the run No. 1 position. Writing head control knob 54 (FIG. 2) is set to the "on" position. The manual reset button 75 associated with thep rogrammer 33 is then momentarily depressed. This places the word counter 65 of programmer 33 (FIG. 5) in a word 12 condition and the 3-stage shift register 84 (FIG. 2) in an initial character 3 condition. The push-button switch 72 associated with the programmer 33 may then be used to place various survey identification and preliminary calibration data in the first twelve words (frame) on the magnetic tape 34*a*.

The first run or trip through the borehole 15 is now ready to commence. To this end, the downhole instrument housing 20*a* is raised at a more or less uniform rate through the borehole 15 by means of the cable 21 and the drum and winch mechanism 23. At the same time, the various exploring devices or measuring devices contained within or located on the instrument housing 20*a* are continuously energized to measure various borehole conditions and properties of the surrounding earth formations. The resulting measurement signals are sent up the various conductors contained within the cable 21 to the control panel 24 located at the surface. These measurement signals, which are in analog form, are supplied to the photographic recorder 26 to produce corresponding traces on the photographic film 26*e* which is being moved in synchronism with the movement of the instrument housing 20*a* through the borehole. This produces the customary graphic log or record.

At the same time, the various analog signals from the downhole measuring devices are also supplied to different ones of the inputs of the magnetic tape recorder circuits 32. At the same time, depth pulses are being supplied from the pulse shaper 40 to the programmer 33. These depth pulses are produced by the slotted shutter disk 36 which is being driven by the measuring wheel 35 which engages the cable 21. The "gear ratio" is such that the pulse shaper 40 generates a depth pulse every time the instrument housing 20*a* moves a distance of one-half inch through the borehole 15. At the same time, the depth encoder 41 is being driven by mechanical linkage 28 so as to remain in step with the mechanical depth counter 30. The depth encoder 41 produces a 12-bit parallel-type binary coded decimal output signal representing the numerical value of borehole depth as shown on mechanical depth counter 30 to the nearest 10 feet. At the commencement of the borehole survey, the depth encoder 41 is initially adjusted, if necessary, to agree with the mechanical counter 30.

As seeen in FIG. 5, each half-inch depth pulse supplied to the programmer 33 is effective to generate three successive timing signals $t_1$, $t_2$ and $t_3$. Each half-inch depth pulse is also effective to advance the word counter 65 one count. Word counter 65 together with matrix 66, OR circuits 68 and 69, inverter circuit 70 and OR circuit 71, operate to generate various gating signals during different ones of the twelve word intervals for each frame of data. Gating signals SW1–SW6 are word length gating signals which are used to control the commutator switches 50 (FIG. 2). The word or words during which these gating signals occur is determined by the setting of selector switches 67*a*–67*f*, together with the interconnection between these switches and the matrix 66. The $\overline{W1}$ (not word 1) gating signal is present during runs 1, 2 and 3 for words 2–12, while the W1 (word 1) gating signal is present during run 1 for word 1. The "S" gating signal is present during run 1 for word 12, while the RX gating signal is present for any word during which one of the commutator switches 50 is conductive. The timing signals $t_1$, $t_2$ and $t_3$ and the various gating signals are supplied to the recorder circuits 32 to control various operations therein.

Considering now the operation of the recorder circuits 32 shown in FIG. 2, it will first be explained how the magnetic tape 34*a* is advanced a predetermined distance for each half-inch depth pulse and how one word (three characters) of data is written or recorded on the tape 34*a* during each such advance. Movement of the tape 34*a* is initiated during run 1 by the $t_3$ timing pulse which is supplied to the start terminal of the motor drive circuits 81. The magnetic tape 34*a* is then rapidly advanced by the motor 34*g* and capstan 34*f* until precorded reference marks for three successive character groups have been detected by reading heads 34*c*. As soon as the third character group is detected, the motor 34*g* is disabled by supplying a C3 character pulse to the "stop" terminal of the motor drive circuits 81. This starting and stopping process is repeated for each half-inch depth pulse.

In order to produce the C3 character pulse which is used to stop the motor 34*g*, the seven output lines from the reading head circuits 82 are supplied to OR circuit 83 to produce at the output thereof a shift pulse which is supplied to the 3-stage shift register 84. Initially, the shift register 84 is in the character 3 condition. The first shift pulse, corresponding to the detection of the first character group on the tape 34*a*, causes the register 84 to shift from the character 3 to the character 1 condition. This shifting action triggers multivibrator 85 and subsequently produces a C1 character pulse at the output of delay unit 88. In a similar manner, the shifting occurring upon the detection of the second and third character groups produces C2 and C3 character pulses at the outputs of delay units 89 and 90. The C3 character pulse at the output of delay unit 90 is supplied to the "stop" terminal of the motor drive circuits 81.

Each time the magnetic tape 34*a* advances one step, it is desired to write or record a 3-character data word on the tape, unless it is deliberately desired to leave that particular word interval blank for use at a later time. The manner of writing new data words on the tape 34*a* will now be explained. To this end, it is assumed that various analog data signals are being supplied to the inputs of the commutator switches 50. The $t_1$ timing pulse generated upon the occurrence of each half-inch depth pulse is used to do two things. First, it is used to reset the analog-to-digital converter 51 to an initial or "zero" condition. It is also used to advance the word counter 65 in the programmer 33 (FIG. 5) by one count to enable the matrix 66 to generate the word gate for the word to be recorded at this moment. Assuming, for sake of example, that this particular word gate is supplied to the SW1 gating signal terminal, then a first of the commutator switches 50 is closed or rendered conductive upon the occurrence of the $t_1$ timing signal. This supplies one of the analog data signals to the input of the analog-to-digital converter 51. A short time thereafter, the $t_2$ timing pulse occurs and is supplied to the "start" terminal of the analog-to-digital converter 51 to start the conversion process therein. This conversion process is completed before the occurrence of the $t_3$ timing pulse. As a consequence, at the occurrence of the $t_3$ timing pulse, which is the moment at which the motor 34*g* is started, the twelve binary data bits representing the selected one of the analog input signals is, at this moment, being supplied to the input of the selector circuits 52.

As the magnetic tape 34*a* advances, the three parallel character pulses C1, C2 and C3 are generated and are supplied to the selector circuits 52 to cause the transfer of the twelve binary data bits from converter 51 to the writing head circuits 53 in three successive groups. In other words, the character pulses C1, C2 and C3 are used to produce signals which are supplied to the writing head circuits 53 for recording data values on the magnetic tape 34*a*. These recorded data values will be evenly spaced on the magnetic tape 34*a*, since the prerecorded reference marks which gave rise to the C1, C2 and C3 character pulses were evenly spaced on the magnetic tape 34*a*.

As the tape 34*a* is advanced in a step-wise fashion during the first run, the reading heads 34*c* are effective to sense the prerecorded reference marks and, at the same time, the writing heads 34*d*, which are located on the downstream side thereof, are effective to write new data words on the tape 34*a*. The writing of the new data words is effective to eliminate or remove the prerecorded reference marks from the tape 34*a*. In fact, as a general matter, whenever writing heads 34*d* are operative, movement of the magnetic tape 34*a* past the writing heads 34*d* changes, where necessary, the flux patterns on the tape to correspond to the magnetizing conditions of the writing heads 34*d* at the moment of passage. Thus, in general, the writing heads 34*d* are effective to "remagnetize" the tape. In addition to recording binary indications of the analog data signals, the selector circuits 52 are also operative at the appropriate moments to record binary-coded decimal indications of the borehole depth as provided by the depth encoder 41.

The operation of selector circuits 52 is seen by referring to FIG. 8. As there seen, the twelve data bits from the analog-to-digital converter 51 are supplied to AND gates 100, while the twelve data bits from the depth encoder 41 are supplied to AND gates 102. The outputs of both AND gates 100 and 102 are coupled together to form twelve common bit lines by means of OR circuits 101. These twelve common bit lines are divided into three groups and connected to different ones of the character gates 103, 104, and 105. Auxiliary signals D1, D2, R1, R2 and S (S1, S2) are also connected to appropriate ones of the character gates 103, 104 and 105, the first two by way of two of AND gates 102, the second two by way of AND gates 112, and the last one by way of direct connection. The $\overline{W1}$ and W1 gating signals from the programmer 33 determine which of the AND gates 100 and 102 are operative, the former being operative during words 2–12 and the latter being operative during word 1.

The parallel character pulses C1, C2 and C3 are effective to produce the transfer of the data values appearing at the inputs of the character gates 103, 104 and 105 to the writing head circuits 53 during the occurrence of such character pulses. Thus, a C1 character pulse produces at the output of character gates 103 a pulse on each of the six output lines thereof for which the corresponding input line is at a binary "one" level. These six output lines are connected by way of different ones of the output OR circuits 106–111 to different ones of the output lines 106a–111a running to the writing head circuits 53. In this manner, the C1 character pulse causes the bit values for the first character group to be recorded in the first six tracks on the magnetic tape 34a.

In a similar manner, the C2 character pulse supplied to character gate 104 causes the bit values for the second character group to be recorded on the magnetic tape 34a during the occurrence thereof, while the C3 character pulse supplied to character gates 105 causes the bit values for the third character group to be recorded on the magnetic tape 34a during the occurrence of such C3 character pulse.

During the first run with the first downhole instrument housing 20a, borehole depth values, as provided by depth encoder 41, are written in word 1 of each frame, provided the depth value is an even multiple of 10 feet. Otherwise, word 1 is left blank. Also, data signal values for the four different measuring devices incorporated in the downhole instrument housing 20a are recorded in succession at words 3, 5, 7 and 9 of each frame during the first run. The remainder of the word intervals on the magnetic tape, namely, words 2, 4, 6, 8, 10, 11 and 12, are left blank, except that frame sync indications are recorded on tracks 5 and 6 for character 3 of word 12.

Actually, none of the word intervals on the magnetic tape 34a is left completely blank. In particular, parity computer 94 (FIG. 2) is used to record a binary "one" indication in track 7 on the tape 34a for each character interval which does not otherwise have a "one" indication or which has an even number of "one" indications. As previously indicated, these binary "one" indications are in the form of flux transitions provided by reversing the polarity of the magnetic flux.

After the first run through the borehole 15, the downhole instrument housing 20a is removed from the borehole 15, detached from the cable 21, and replaced by a new downhole instrument housing 20b having incorporated therein or thereon a different set of measuring devices. In the present example, this second set of measuring devices includes a proximity log device, a microlog "normal" device, a microlog "inverse" device and a borehole caliper device. The magnetic tape 34a is then rewound so as to put it back in its initial position with most of it being located on the supply reel 34b. The second instrument housing 20b is then lowered to the same starting point in the borehole as for the first instrument housing 20a. During this lowering process, the recorder circuits 32, programmer 33, and tape transport 34 again remain inactive. The playback circuits 42 may be used to verify that the magnetic tape 34a is in the appropriate starting position, the main programmer control knob 33a being set to the playback (PB) position, writing head control knob 54 being set to the "off" position, and the manual stepping switch 72 being used to examine the initial frame of data on the tape 34a.

With both the downhole instrument housing 20b and the magnetic tape 34a properly set at their initial positions, the programmer control knob 33a is set to the run 2 position and writing head control knob 54 is set to the "on" position. The second borehole survey is now ready to commence. The second survey proceeds in the same manner as did the first survey, namely, with the measuring devices being energized in a continuous manner and the second instrument housing 20b being moved upwardly through the borehole at a more or less constant rate. As before, the pulse shaper 40 is effective to supply half-inch depth pulses to the programmer 33. The magnetic tape 34a is advanced in a step-wise manner, one step for each half-inch depth pulse, in the same manner as during run No. 1. In particular, each $t_3$ timing pulse is effective to start the motor drive circuits 81, while each C3 character pulse produced upon the detection of the third character group on the magnetic tape 34a is effective to stop the motor drive circuits 81.

During the second run, two things must be accomplished. First, the data values recorded during the first run must be preserved. Second, the new data being obtained during the second run must be recorded in some of the word intervals left blank during the first run.

The previously recorded data is preserved by rewriting it on the tape 34a. This is accomplished by coupling the six data lines from the reading head circuits 82 back to the selector circuits 52 by way of AND gates 91. During run No. 2, switch 92 is effective to supply the serial character pulse groups C123 (waveform 7I) to the AND gates 91 to enable the reading head circuit output pulses (waveform 7E) to be supplied to the selector circuits 52. As seen in FIG. 8, the six data lines from AND gates 91 are individually coupled to different ones of the six output OR circuits 106–111. Thus, any output pulses on the six data lines from reading head circuits 82 will immediately be supplied to the writing head circuits 53 by way of these output OR circuits 106–111.

During the occurrence of previously recorded data signals, no new data signals will be supplied to the selector circuit 52 because none of the commutator switches 50 will be conductive and, hence, the output of the analog-to-digital converter 51 will remain in a "zero" condition. No new signals from the depth encoder 41 will be supplied to the writing head circuits 53 because no W1 gating signal will be supplied to the AND gates 102 during run 2. No auxiliary polarity signals (R1 and R2) will be supplied during the rewriting of previously recorded data signals, since the RX gating signal will not be supplied to the AND circuits 112 at such times. Also, no auxiliary frame sync signal (S) is supplied to the selector circuits 52 during run No. 2.

The writing of the new data signals in the "blank" words on the magnetic tape 34a is accomplished by closing the commutator switches 50 at the appropriate moments of time corresponding to the blank words. This is accomplished by the SW1–SW6 gating signals supplied by the programmer 33. During the occurrence of one of these gating signals during the appropriate word interval, one of the new data signals is supplied to the analog-to-digital converter 51 to provide a 12-bit binary representation thereof. This 12-bit binary signal is then transferred by way of AND gates 100, OR circuits 101 and the three character gates 103, 104 and 105 to the output OR circuits 106–111 in groups of four bits each during the appropriate character intervals. No previously recorded data are being supplied at this time by way of AND gates 91, since no binary "one" indications were recorded in the first six tracks on the tape 34a during this word interval. Auxiliary polarity signals (R1, R2) will be provided by AND circuit 112 whenever a new data word is being written. Also, the parity computer 94 is operative to again record a binary "one" indication in track 7 for any character interval containing no or an even number of binary "one" indications. This is accomplished by examining the six data bits which are at the moment being supplied to the writing head circuits 53.

Correct synchronization of the shift register 84 (FIG. 2) and the word counter 65 (FIG. 5) is maintained by means of AND circuit 95 (FIG. 2) which is operative to detect the frame sync auxiliary signals recorded during run No. 1. These frame sync signals recorded at character 3 of word 12 of each frame produce at the output of AND circuit 95 an output pulse which is used to reset the word counter 65 to a word 12 condition and the shift register 84 to a character 3 condition.

For the present example, new data values are recorded at words 2, 4, 6, 8, 10 and 12 on the magnetic tape 34a during run No. 2. These represent word intervals left blank during the first run. The word 11 interval of each frame is not used during either run No. 1 or run No. 2 and, hence, remains in a blank condition (except for parity indications). The previously recorded data values recorded during run 1 are rewritten on the magnetic tape **34*a*** during the same word intervals as before.

One purpose of rewriting the previously recorded data values on the second or a subsequent run is to enable the use of a non-return-to-zero (NRZ) type of recording on the tape **34*a*** wherein flux transitions represent binary "one" values. This is necessary since successive flux transitions must be in opposite directions and since what was recorded on the first run might not be compatible with what is desired to record on the second run with respect to such flux transitions.

After completing the second run through the borehole 15, the second downhole instrument housing **20*b* is removed from the cable 21 and replaced by a third instrument housing 20*c*. The third instrument housing 20*c* is then lowered to the previous starting point in the borehole 15, the magnetic tape 34*a* is rewound and placed in its initial starting position, programmer control knob 33*a* is set to the run 3 position, and the third run through the borehole is commenced. In the present example, the third instrument housing 20*c* includes a sonic exploring device for measuring the travel time for sonic signals through the adjacent earth formations. The magnetic tape 34*a* is again advanced in a step-wise manner under the control of the half-inch depth pulses and the sonic data signal is converted to a binary form and recorded at word 11 of each frame. Intermediate the periodic recordings of word 11, the data previously recorded on the magnetic tape 34*a* is read and rewritten thereon in the same manner as in run No. 2. The primary difference between runs 2 and 3 is the time of occurrence of the various gating signals provided by the programmer 33**.

After the completion of the third run, the magnetic tape **34*a* is completely filled and ready for future use. One such use would be the automatic interpretation of the recorded data. This can be accomplished by removing the tape 34*a* from the present apparatus and using it to provide the input data for a large-scale digital computer which has been properly programmed to perform the desired interpretation procedures. During such a subsequent computer playback, the magnetic tape 34*a* may be driven at constant speed by tape playback equipment of the type commonly associated with digital computers. The manner of recording (format) used on the magnetic tape 34*a*** is compatible with the input requirements for a variety of commercially available computers.

The data recorded on the tape **34*a* may be reproduced for subsequent use by means of the playback circuits 42 of the present apparatus. In such case, the programmer control knob 33*a* is set to the playback (PB) position and the writing head control knob 54 is set to the "off" position. It is also necessary to provide drive pulses similar to the half-inch depth pulses to the programmer 33 in order to cause the tape to step in a proper manner. This can be done by means of the push-button switch 72, by either manual or automatic rotation of the shutter disk 36, or by connecting a free-running pulse generator circuit to the depth pulse input of the programmer 33. In this type of playback mode, the magnetic tape 34*a* is merely read and there is no rewriting of the data recorded on the tape. Also, the data is left intact on the tape since it is not erased either (writing heads 34*d* are disabled). Also, since there is no need for an analog-to-digital conversion, the switch 80 associated with the input to the motor drive circuit 81 is set so that the "start" terminal thereof is energized by the $t_1$, as opposed to the $t_3$, timing pulses. Among other things, the resulting analog output signals from the playback circuits 42 may be supplied to the individual galvanometer elements of a photographic recorder which is being driven at a constant rate by a suitable motor. In this regard, the same motor might be used to drive both the photographic recorder and the shutter disk 36** during such subsequent playback.

The playback circuits 42 may be utilized during the second and subsequent recording runs for purposes of providing additional input signals for either the recorder circuits 32 or the photographic recorder 26. For example, the playback circuits 42 can be used to reproduce the signals recorded on the first run and supply them to a computer 44 to develop computed signals which are then supplied as additional input signals to the recorder circuits 32 during a second or subsequent recording run.

A magnetic tape recorded with the present apparatus can also be used with high-speed tape playback apparatus so as to make the recorded data available at a higher rate than is possible with the incremental type of tape transport of the present invention. This same type of results may be accomplished with the present apparatus by connecting the motor **34*g*** to a continuous source of operating voltage for providing continuous operation thereof.

A feature of the present invention is that new and improved means have been provided for recording well logging data on magnetic tape where distance along the tape is proportional to distance along the borehole and where uniform bit density is provided even though the logging speed may vary over a considerable range.

Depth encoder 41, playback circuits 42 and parity computer 94 are described in greater detail in the above-mentioned parent application Ser. No. 394,174, of which this application is a division. Such descriptions are incorporated herein by reference thereto.

While there has been described what is at present considered to be a preferred embodiment of this invention, it will be obvious to those skilled in the art that various changes and modifications may be made therein without departing from the invention, and it is therefore, intended to cover all such changes and modifications as fall within the true spirit and scope of the invention.

What is claimed is:

1. Apparatus for supplying data signals to a magnetic tape recorder having a predetermined number of recording heads for recording signals in parallel tracks on a magnetic recording tape comprising:

a plurality of output circuit means individually adapted to supply signals to a different one of the recording heads;

input circuit means for successively supplying plural bit digital data signals, the number of component bit signals in each digital data signal being greater than the predetermined number of recording heads;

circuit means coupled to the input circuit means and operative at a first moment of time during the occurrence of each data signal to supply a first group of the component bit signals to the output circuit means;

and additional circuit means coupled to the input circuit means and operative at a second and different moment of time during the occurrence of each data signal to supply a second group of the component bit signals to the output circuit means, whereby the component bit signals comprising each complete data signal may be recorded in successive groups on the magnetic tape.

2. Apparatus for recording data signals on a magnetic recording tape comprising:

a predetermined number of recording heads for recording signals in parallel tracks on the magnetic recording tape;

first circuit means for supplying analog data signals;

converter circuit means for successively converting each analog data signal into a plural bit digital data signal, the number of component bit signals in each digital data signal being greater than the predetermined number of recording heads;

second circuit means coupled to the converter circuit means and operative at a first moment of time during the occurrence of each digital data signal to supply a first group of the component bit signals to the recording heads;

and third circuit means coupled to the converter circuit means and operative at a second and different moment of time during the occurrence of each digital data signal to supply a second group of the component bit signals to the recording heads.

3. Apparatus for recording data signal indications on a magnetic recording tape already having some indications recorded thereon comprising:

a predetermined number of recording heads for recording signal indications in parallel tracks on the magnetic recording tape;

reading head means for detecting indications previously recorded on the magnetic recording tape;

the recording heads and the reading head means being located in close physical proximity to one another and being capable of simultaneous operation;

tape drive means for moving the magnetic tape past the recording heads and the reading head means;

electric motor means for actuating the tape drive means;

circuit means for supplying analog data signals;

converter circuit means for successively converting each analog data signal into a plural bit digital data signal, the number of component bit signals in each digital data signal being greater than the predetermined number of recording heads;

signal reproducing circuit means coupled to the reading head means and responsive to detected indications to produce corresponding detected signal pulses;

circuit means responsive to each detected signal pulse for suppressing the initial portion thereof, thereby to produce output detected signal pulses which are less likely to include spurious impulse components induced by the operation of the nearby recording heads;

circuit means coupled to the converter circuit means and responsive to output detected signal pulses occurring at first moments of time during the occurrence of the digital data signals to supply a first group of the component bit signals of each digital data signal to the recording heads;

circuit means coupled to the converter circuit means and responsive to output detected signal pulses occurring at second and different moments of time during the occurrence of the digital data signals to supply a second group of the component bit signals of each digital data signal to the recording heads;

energizing circuit means for recurrently supplying energizing current to the electric motor means and responsive to the output detected signal pulses for recurrently discontinuing the supplying of the energizing current;

and circuit means coupled to the energizing circuit means for momentarily supplying opposite polarity current to the electric motor means each time the supplying of energizing current is discontinued, thereby to more rapidly halt the movement of the magnetic tape each time the supplying of energizing current is discontinued.

4. Apparatus for recording data signal indications on a magnetic recording tape already having some indications recorded thereon comprising:

a predetermined number of recording heads for recording data signal indications in parallel tracks on the magnetic recording tape;

reading head means for detecting indications previously recorded on the magnetic recording tape;

tape transport means for moving the magnetic tape past the recording heads and the reading head means;

circuit means coupled to the reading head means and responsive to detected indications for producing control pulses;

data signal circuit means for successively supplying plural bit digital data signals, the number of component bit signals in each digital data signal being greater than the predetermined number of recording heads;

circuit means coupled to the data signal circuit means and responsive to the control pulses for supplying to the recording heads at a first moment of time during the occurrence of each digital data signal a first group of the component bit signals;

and circuit means coupled to the data signal circuit means and responsive to the control pulses for supplying to the recording heads at a second and different moment of time during the occurrence of each digital data signal a second group of the component bit signals.

5. Apparatus for recording data signal indications on a magnetic recording tape already having some indications recorded thereon comprising:

a predetermined number of recording heads for recording data signal indications in parallel tracks on the magnetic recording tape;

reading head means for detecting indications previously recorded on the magnetic recording tape;

tape transport means for moving the magnetic tape past the recording heads and the reading head means;

circuit means coupled to the reading head means and responsive to detected indications for producing control pulses;

data signal circuit means for successively supplying plural bit digital data signals, the number of component bit signals in each digital data signal being greater than twice the predetermined number of data signal recording heads;

first circuit means coupled to the data signal circuit means and responsive to the control pulses for supplying to the data signal recording heads at a first moment of time during the occurrence of each digital data signal a first group of the component bit signals;

second circuit means coupled to the data signal circuit means and responsive to the control pulses for supplying to the data signal recording heads at a second and different moment of time during the occurrence of each digital data signal a second group of the component bit signals;

and third circuit means coupled to the data signal circuit means and responsive to the control pulses for supplying to the data signal recording heads at a third and different moment of time during the occurrence of each digital data signal a third group of the component bit signals.

6. Apparatus for recording data signal indications on a magnetic recording tape already having some indications recorded thereon comprising:

a predetermined number of recording heads for recording data signal indications in parallel tracks on the magnetic recording tape;

reading head means for detecting indications previously recorded on the magnetic recording tape;

tape transport meas for moving the magnetic tape past the recording heads and the reading head means;

circuit means coupled to the reading head means and responsive to detected indications for producing control pulses;

circuit means for supplying recurrent timing signals;

circuit means responsive to the timing signals and the control pulses for recurrently activating and disabling the tape transport means;

data signal circuit means for successively supplying plural bit digital data signals in step with the timing signals, the number of component bit signals in each digital data signal being greater than the predetermined number of recording heads;

circuit means coupled to the data signal circuit means and responsive to the control pulses for supplying to the recording heads at a first moment of time during the occurrence of each digital data signal a first group of the component bit signals;

and circuit means coupled to the data signal circuit means and responsive to the control pulses for supplying to the recording heads at a second and different moment of time during the occurrence of each digital data signal a second group of the component bit signals.

7. Apparatus for recording data signal indications on a magnetic recording tape already having some indications recorded thereon comprising:

a predetermined number of recording heads for recording data signal indications in parallel tracks on the magnetic recording tape;

reading head means for detecting indications previously recorded on the magnetic recording tape;

tape transport means for moving the magnetic tape past the recording heads and the reading head means;

circuit means coupled to the reading head means and responsive to detected indications for producing control pulses;

circuit means for supplying recurrent timing signals;

circuit means responsive to the timing signals for activating the tape transport means upon each occurrence thereof and responsive to the control pulses for disabling the tape transport means upon the occurrence of a predetermined number of such control pulses;

data signal circuit means for successively supplying plural bit digital data signals in step with the timing signals, one digital data signal being supplied for each timing signal, the number of component bit signals in each digital data signal being greater than the predetermined number of recording heads;

circuit means coupled to the data signal circuit means and responsive to the first control pulse occurring after each activation of the tape transport means for supplying to the recording heads at a first moment of time during the occurrence of each digital data signal a first group of the component bit signals;

and circuit means coupled to the data signal circuit means and responsive to the second control pulse occurring after each activation of the tape transport means for supplying to the recording heads at a second and different moment of time during the occurrence of each digital data signal a second group of the component bit signals.

8. Apparatus for recording well logging measurements on a magnetic recording tape already having some indications recorded thereon comprising:

a predetermined number of recording heads for recording signal indications in parallel tracks on the magnetic recording tape;

reading head means for detecting indications previously recorded on the magnetic recording tape;

the recording heads and the reading head means being located in close physical proximity to one another and being capable of simultaneous operation;

tape drive means for moving the magnetic tape past the recording heads and the reading head means;

electric motor means for actuating the tape drive means;

circuit means for supplying a plurality of individual analog well logging measurement data signals produced by a plurality of measuring devices as they are moved through a borehole drilled into the earth;

converter means for successively converting each analog well logging measurement data signal into a plural bit digital data signal, the number of component bit signals in each digital data signal being greater than the predetermined number of recording heads;

signal reproducing circuit means coupled to the reading head means and responsive to detected indications to produce corresponding detected signal pulses;

circuit means responsive to each detected signal pulse for suppressing the initial portion thereof, thereby to produce output detected signal pulses which are less likely to include spurious impulse components induced by the operation of the nearby recording heads;

circuit means coupled to the converter circuit means and responsive to output detected signal pulses occurring at first moments of time during the occurrence of the digital data signals to supply a first group of the component bit signals of each digital data signal to the recording heads;

circuit means coupled to the converter circuit means and responsive to output detected signal pulses occurring at second and different moments of time during the occurrence of the digital signals to supply a second group of the component bit signals of each digital data signal to the recording heads;

energizing circiut means for recurrently supplying energizing current to the electric motor means and responsive to the output detected signal pulses for recurrently discontinuing the supplying of the energizing current;

and circuit means coupled to the energizing circuit means for momentarily supplying opposite polarity current to the electric motor means each time the supplying of energizing current is discontinued, thereby to more rapidly halt the movement of the magnetic tape each time the supplying of energizing current is discontinued.

References Cited

UNITED STATES PATENTS

| | | | |
|---|---|---|---|
| 3,016,522 | 1/1962 | Lourie et al. | 179—100.2 |
| 3,075,050 | 1/1963 | Lorenz | 179—100.2 |
| 3,134,957 | 5/1964 | Foote et al. | 179—100.2 |
| 3,164,815 | 1/1965 | Applequist | 340—174.1 |
| 3,332,084 | 7/1967 | Wahrer et al. | 340—174.1 |
| 2,951,236 | 8/1960 | Covely III et al. | 340—174.1 |
| 3,357,002 | 12/1967 | Smith-Vaniz et al. | 340—174.1 |

TERRELL W. FEARS, Primary Examiner

V. P. CANNEY, Assistant Examiner